United States Patent
Yamamoto et al.

[11] Patent Number: 6,101,203
[45] Date of Patent: Aug. 8, 2000

[54] FUNCTION ELEMENT USING QUANTUM INTERFERENCE EFFECT

[75] Inventors: Kazushige Yamamoto; Kouichi Ichimura; Nobuhiro Gemma, all of Yokohama, Japan

[73] Assignee: Kabushiki Kaisha Toshiba, Kawasaki, Japan

[21] Appl. No.: 09/162,449

[22] Filed: Sep. 29, 1998

[30] Foreign Application Priority Data

Sep. 29, 1997 [JP] Japan ................................ 9-263853

[51] Int. Cl.[7] ...................................................... H01S 3/14
[52] U.S. Cl. ........................................... 372/39; 359/244
[58] Field of Search ............................ 359/244–248; 372/35–42

[56] References Cited

U.S. PATENT DOCUMENTS

| | | | |
|---|---|---|---|
| 5,256,849 | 10/1993 | Scully | 219/121.68 |
| 5,699,374 | 12/1997 | Ichimura et al. | 372/39 |
| 5,754,511 | 5/1998 | Gemma et al. | 369/100 |
| 5,898,720 | 4/1999 | Yamamoto et al. | 372/39 |

OTHER PUBLICATIONS

B.S. Ham, et al., "Enhanced Nondegenerate Four–Wave Mixing Owing to Electromagnetically Induced Transparency in a Spectral Hole–Burning Crystal", Optics Letters, vol. 22, No 15, Aug. 1, 1997, pp. 1138–1140.

M.S. Shahriar, "Direct Excitation of Microwave–Spin Dressed States Using a Laser–Excited Resonance Raman Iteraction", Physical Review Letters, vol. 65, No. 15, Oct. 8, 1990, pp. 1865–1868.

D.V. Kosachiov, et al., "Coherent Phenomena in Multilevel Systems with Closed Interaction Contour", J. Phys. B: At. Mol. Opt. Phys., vol. 25 (1992), pp. 2473–2488.

A. S. Zibrov, et al., "Experimental Demonstration of Laser Oscillation Without Population Inversion via Quantum Interference In Rb", Physical Reviews Letters, vol. 75, No. 8, Aug. 21, 1995, pp. 1499–1502.

Yifu Zhu, et al., "Intensity Characteristics of Inversionless Lasers from Induced Atomic Coherence", Physical Review A, vol. 49, No. 5, May 1994, pp. 4016–4023.

M.A.G. Martinez, et al., "Quantum Interference Effects in Spontaneous Atomic Emission: Dependence of the Resonance Fluorescence Spectrum on the Phase of the Driving Field", Physical Review A, vol. 55, No. 6, Jun. 1997, pp. 4483–4491.

Pál Bogár, et al., "Two–Mode Lasing Without Inversion with Injected Atomic Coherence", Physical Review A, vol. 56, No. 1, Jul. 1997, pp. 1012–1022.

N. Ph, Georgiades, et al., "Atoms as Nonlinear Mixers for Detection of Quantum Correlations at Ultrahigh Frequencies", Physical Review A, vol. 55, No. 3, Mar. 1997, pp. R1605–R1608.

Yang Zhao, et al. "Microwave Induced Transparency in Ruby", Physical Review Letters, vol. 79, No. 4, Jul. 28, 1997, pp. 641–644.

H. Schmidt, et al., "Tunnneling Induced Transparency: Fano Interference in Intersubband Transitions", Appl. Phys. Lett., vol. 70, No. 25, Jun. 23, 1997, pp. 3455–3457.

(List continued on next page.)

*Primary Examiner*—Hung Xuan Dang
*Attorney, Agent, or Firm*—Oblon, Spivak, McClelland, Maier & Neustadt, P.C.

[57] ABSTRACT

A light-modulating element having a RQB medium, a pair of electrodes provided on the RQB medium and connected to a high-frequency power supply, a signal light source for emitting two signal light beams, and two optical fibers for guiding the signal light beams to the RQB medium. In the element, the conditions $\sigma_{23} \leq \sigma_{12}$ and $\sigma_{23} \leq \sigma_{13}$ are satisfied, where $\sigma_{12}$ is the standard deviation (inhomogeneous broadening) of energies of impurities between a first level and a second level, $\sigma_{13}$ is the standard deviation (inhomogeneous broadening) of energies of impurities between first level and a third level, and $\sigma_{23}$ is the standard deviation (inhomogeneous broadening) of energies of impurities between the second and third levels, all impurities existing in the RQB medium.

22 Claims, 20 Drawing Sheets

OTHER PUBLICATIONS

Danhong Huang, et al., "Coulomb and Light–Induced Electronic Renormalization in Quantum Wells for Electromagnetically Induced Transparency and Light Amplification Without Inversion", J. Opt. Soc. Am. B/vol. 11, No. 11, Nov. 1994, pp. 2258–2265.

P.J. Harshman, et al., "Strong Field Theory of Low Loss Optical Switching and Three–Wave Mixing in a Semiconductor Quantum Well", IEEE Journal of Quantum Electronics, vol. 30, No. 10, Oct. 1994, pp. 2297–2303.

A. Imamglu, et al., "Semiconductor Lasers Without Population Inversion", Optics Letters, vol. 19, No. 21, Nov. 1, 1994, pp. 1744–1746.

D. Kosachiov, et al., "Coherent Population Trapping: Sensitivity of an Atomic System to the Relative Phase of Exciting Fields", Optics Communications, vol. 85 (1991) pp. 209–212.

N. Ph. Georgiades, et al., "Frequency Metrology by use of Quantum Interference", Optics letters, vol. 21, No. 20, Oct. 15, 1996, pp. 1688–1690.

Fam Le Kien, et al., "Quantum Theory of the One–Mode $\Lambda$–Type Micromaser and Laser", Physical Review A, vol. 51, No. 2, Feb. 1995, pp. 1644–1649.

János A. Bergou, "Quantum Theory of a Noninversion Laser with Injected Atomic Coherence", Physical Review A, vol. 43, No. 9, May 1, 1991, pp. 4889–4900.

Marlan O. Scully, et al., "Degenerate Quantum–Beat Laser: Lasing Without Inversion and Inversion Without Lasing", Physical Review Letters, vol. 62, No. 24, Jun. 12, 1989, pp. 2813–2816.

A. Kasapi, et al., "Electromagnetically Induced Transparency: Propagation Dynamics", Physical Review Letters, vol. 74, No. 13, Mar. 27, 1995, pp. 2447–2450.

Yong–qing Li, et al., "Observation of an Electromagnetically Induced Change of Absorption in Multilevel Rubidium Atoms", Physical Review A, vol. 51, No. 3, Mar. 1995, pp. R1754–R1757.

A.M. Akulshin, et al., "Sub–Natural Absorption Resonance on the $D_1$ Line of Rubidium Induced by Coherent Population Trapping", Optics Communications, vol. 84, Nos, 3, 4, Jul. 15, 1991, pp. 139–143.

Satoru Adachi, et al., "Experimental and Numerical Studies on Population Trapping In Gd Vapor", Optics Communications, vol. 81, No. 6, Mar. 15, 1991, pp. 364–368.

A. Aspect, et al., "Laser Cooling Below the One–Photon Recoil Energy by Velocity–Selective Coherent Population Trapping", Physical Review Letters, vol. 61, No. 7, Aug. 15, 1988, pp. 826–829.

Matti Kaivola, et al., "Observation of Population Trapping in a Two–Photon Resonant Three–Level Atom", Optics Communications, vol. 49, No. 6, Apr. 15, 1984, pp. 418–422.

H.R. Gray, et al., "Coherent Trapping of Atomic Populations", Optics Letters, vol. 3, No. 6, Dec. 1978, pp. 218–220.

G. Alzetta, et al., "An Experimental Method for the Observation of R.F. Transitions and Laser Beat Resonances in Oriented Na Vapour", Il Nouvo Cimento, vol. 36 B, No. 1, Nov. 11, 1976, pp. 5–20.

E. Arimondo, et al., "Nonabsorbing Atomic Coherences by Coherent Two–Photon Transitions in a Three–Level Optical Pumping", Lettere al Nuovo Cimento, vol. 17, No. 10, Nov. 6, 1976, pp. 333–338.

Marian o. Scully, "Enhancement of the Index of Refraction via Quantum Coherence", Physical Review Letters, vol. 67, No. 14, Sep. 30, 1991, pp. 1855–1858.

S. E. Harris, "Lasers Without Inversion: Interference of Lifetime–Broadened Resonances", Physical Review Letters, vol. 62, No. 9, Feb. 27, 1989, pp. 1033–1036.

K.–J. Boller, et al., "Observation of Electromagnetically Induced Transparency", Physical Review Letters, vol. 66, No. 20, May 20, 1991, pp. 2593–2596.

FUNCTION ELEMENT USING QUANTUM INTERFERENCE EFFECT

BACKGROUND OF THE INVENTION

The present invention relates to a function element such as a light-modulating element or an LWI (Laser Without Inversion) laser which operates without population inversion, which operates by virtue of quantum interference effect in a solid.

Optical characteristics of a substance, such as absorption and emission, have been considered to be specific to the substance. In recent years, research has been widely conducted on the techniques of modulating the optical characteristics of substances by means of quantum interference effect. Quantum interference effect is a phenomenon in which, as shown in FIG. 1, absorption and emission intensify or weaken each other as two or more optical transitions simultaneously occur between two energy levels in substance.

Quantum interference effect involves in various optical phenomena. Among these optical phenomena are: electromagnetically induced transparency (EIT), described in J. Boller et al., Phys. Rev. Lett. 66, 2593 (1991); lasing without population inversion (LWI), disclosed in S. E. Harris, Phys. Rev. Lett. 62, 1033 (1989); enhancement of index of index of refraction, written in M. O. Scully, Phys. Rev. Lett. 67, 1855 (1991); and population trapping, disclosed in E. Arimondo et al., Lett. Nuovo Cimento, 17, 333 (1976). In EIT, light is not absorbed in substance, penetrating the substance, even if its wavelength falls within a high-absorption region. LWI enables a laser to oscillate without population inversion. Enhancement of refraction enables substance to acquire a large angle of diffraction. Population trapping confines electrons at a particular level even if excitation light is being applied to substance.

The optical phenomena mentioned above are not only novel and surprising from a scientific viewpoint, but also valuable from a technological viewpoint. Research is positively made to develop function elements, such as light-modulating elements and LWI lasers, to which quantum interference effect is applied.

Known as a method of artificially inducing a quantum interference effect is the EIT mentioned above. EIT is a phenomenon found when a laser beam is applied to atom gas. At the time it was found, the phenomenon was called "population trapping," not "EIT".

EIT and population trapping are one and the same phenomenon; "EIT" is a term emphasizing the resultant spectrum, while "population trapping" is a term accentuating the resultant distribution of electrons (see G. Alzping et al., Nuovo Cimento, B36, 5 (1976). Since 1978 when it was discovered, EIT has been observed in various atom-gas systems, as is disclosed in, for example, H. R. Gray et al., Opt. Lett. 3, 218 (1978); M. Kaivola et al., Opt. Commun., 49, 418 (1984); A. Aspect et al., Phys. Reve. Lett. 61, 826 (1988); S. Adachi et al., Opt. Commun., 81, 364 (1991); A. M. Akulsin et al., Opt. Commun., 84, 139 (1991); Y. Q. Li et al., Phys. Rev., A51, R1754 (1995); A. Kasapi et al., Phys. Rev. Lett. 74, 2447 (1995).

EIT may be applied in order to provide an LWI laser. An LWI laser in which atom gas is used will be described.

FIGS. 2A, 2B and 2C are schematic diagrams, each showing the energy levels of atom gas and the light beams applied to the atom gas. In a system equivalent to the LWI laser, atom gas may assume three energy levels and two coherent light beams (light 1 and light 2) are applied to atom gas to excite the gas. Three schemes exist, by virtue of level-light combination. FIGS. 2A, 2B and 2C shows the first scheme, second scheme and third scheme, respectively. In the first scheme (FIG. 2A) hereinafter referred to as "Λ-type excitation", the highest level 1 is common level and two light beams excite the atom gas. In the second scheme (FIG. 2B) hereinafter referred to as "V-type excitation", the base level 3 is common level and two light beams excite the atom gas. In the third scheme (FIG. 2C) hereinafter referred to as "Ξ-type excitation", the intermediate level 2 is common level and two light beams excite the atom gas.

To induce a quantum interference effect in a system wherein Λ-type excitation is performed, it is required that atom gas be forbidden from being excited from level 3 to level 2 (level 2 is in metastable state) and that the relaxation speed be zero.

This requirement is one of the two conditions for inducing a quantum interference effect by virtue of EIT. It is known as a condition for quantum interference, relating to transition probability and relaxation.

Assume that the absorption spectrum of the beam 2 is examined, while changing the photon energy $\omega_1$ of the light beam 1, under the condition of $\delta\omega_1 = \omega_1 - \omega_{12} = 0$, that is, the photon energy $\omega_1$ of the light beam 1 equals the energy $\omega_{12}$ between the levels 1 and 2. FIG. 3A shows the absorption spectrum of the light beam 2. In FIG. 3A, the value $\delta\omega_2$ plotted on the ordinate is modified by the detuning between the photon energy $\omega_2$ of the light beam 2 and the energy $\omega_{13}$ between the levels 1 and 3. That is, $\delta\omega_2 = \omega_2 - \omega_{13}$.

As seen from FIG. 3A, the absorption spectrum, which should have a single peak, has an absorption hole (i.e., a transparent region) when $\delta\omega_2 = 0$ ($=\delta\omega_1$). Equation of $\delta\omega_2 = \delta\omega_1$ is the other of the two conditions for inducing a quantum interference effect by virtue of EIT, or the condition relating to the detuning.

The transparent region in the absorption spectrum has a width of $\Omega = (\Omega_1^2 - \Omega_2^2)^{1/2}$, where $\Omega_1$ is the Rabi frequency of the light beam 1 and $\Omega_2$ is the Rabi frequency of the light beam 2.

Rabi frequency $\Omega_{12}$ is the strength of interaction between substance and light beam 1 whose Rabi frequency $\Omega_1$ is expressed as $2\pi\mu_{12}E_1/h$, where $\mu_{12}$ is the electric dipole moment between levels 1 and 2, $E_1$ is the electric-field intensity of the light beam 1, and h is Planck's constant. Rabi frequency $\Omega_{13}$ is the strength of interaction between substance and light beam 2 whose Rabi frequency $\Omega_2$ is expressed as $2\pi\mu_{13}E_2/h$, where $\mu_{13}$ is the electric dipole moment between levels 1 and 3, $E_2$ is the electric-field intensity of the light beam 1, and h is Planck's constant.

FIG. 3B shows the absorption spectrum of the light beam 2 observed when the photon energy of the light beam 1 is set in the state of $\delta\omega_1 = \delta\omega_2 = 0$. As can be understood from FIG. 3B, the absorption spectrum has a transparent region at the skirt where $\delta\omega_1 = \delta\omega_2$, which light is not absorbed at all. The transparent region has a width of $\Omega = (\Omega_1^2 - \Omega_2^2 + \delta\omega_2^2)^{1/2}$.

As described above, in the case of EIT, even light that must be greatly absorbed will no longer be absorbed if two light beams are applied. The reason why such light is not absorbed can be explained from dressed-state diagrams.

FIG. 4 illustrates how the natural state of atoms changes as the light beam 1 acts between levels 1 and 2. The levels shown in the left half of FIG. 4 are energy levels a bare atom may have, whereas the levels shown in the right half of FIG. 4 are energy levels a dressed atom may have.

The highest level 1 splits into two nearly degenerate levels for a dressed atom, i.e., an atom on which the light beam 1 acts. The nearly degenerate levels assume a dressed-state. The energy of the atom gas can be raised from the base level 3 to these nearly degenerate levels when one light beam (beam 2) is applied to the atom gas.

The light beam 2 ceases to be absorbed. This phenomenon may be considered to have been caused because two energy transitions from level 3 to two other close levels interfere with each other. Namely, the two energy transitions weaken each other. This interference effect can be caused by other types of excitation, i.e., V-type excitation and Ξ-type excitation. In whichever type of excitation, the mechanism of forming a transparent region in the spectrum can be well explained by the theoretical curve obtained by, for example, analyzing the density matrix.

An LWI laser developed on the basis of EIT may assume one of the three schemes, i.e., Λ-type excitation, V-type excitation and Ξ-type excitation, depending on the combination of the energy level and the light beam. Here again, Λ-type excitation will be discussed.

FIG. 5 is a schematic representation of the energy levels of atom gas and the light beams applied to the atom gas. The light beam 3 applied in addition to light beams 1 and 2 is an incoherent beam for pumping electrons from the ground level to a higher level.

Assume that the coherent light beams 1 and 2 applied to this system satisfy the interference condition with respect to detuning and that the atom gas assumes a quantum interference state and does not absorb the light beam 2. When the incoherent light beam 3 is applied to the system, it is absorbed in the system. This is because the interference effect resulting from EIT does not act on any incoherent light, whereby an energy transition occurs from level 3 to level 1. An incoherent light beam may be regarded as having a broad spectral width that is greater than the width of the transparent region resulting from quantum interference.

In EIT, the interference effect does not work to cause emission. The energy transition between levels 1 and 3, which assumes a quantum interference state, has an asymmetric absorption-emission characteristic. Only emission can take place, particularly in the transparent region.

Electrons excited by the light beam 1 to level 1 fall back to level 3 due to induced radiation caused by the light beam 2. The coherent light beam 2 can be amplified even if the population at level 1 is smaller than the population at level 3 which is lower than level 1, that is, even if the distribution of electrons is not inverted. This amplification, therefore, attracts attention as a principle of laser oscillation.

To provide an LWI laser it suffices to place the system of FIG. 5 in a resonator, apply only the light beam 1 (i.e., a coherent light beam) and pump, by some a method, the electrons from the base level into an excited state. If so, a laser oscillation gain is obtained at a photon energy of about $(\omega_1 - \omega_{23})$, where $\omega_1$ is the photon energy of the light beam 1 which excites the atom gas from level 1 to level 2 and $\omega_{23}$ is the transition energy between levels 2 and 3. As a result, coherent light is generated. The mechanism of the laser oscillation achieved without inverting the electron distribution can be explained by analyzing the density matrix, as is the mechanism of EIT.

Λ-type excitation has been described with reference to FIG. 5. V-type excitation and Ξ-type excitation can also be applied to LWI lasers, as is proved by the analysis of density matrices.

As can be understood from the above description of EIT, it is possible to induce a quantum interference effect in a solid system. Hence, there can be provided a light-modulating element which can operate with weak light and which may, therefore, replace the existing light-modulating element utilizing nonlinear optics and unable to operate with weak light. Further, an LWI laser can be provided which oscillates at a low threshold value in a short-wave region. Moreover, quantum interference may be combined with the various physical properties of a solid, such as electrical conduction, magnetic property and dielectric property, to create a novel function element which differs from the existing electric elements.

However, the following difficulties involve in applying EIT to solid systems.

First, since the interference of the optical transitions between particular energy levels is utilized in EIT, it is difficult to use such an energy level as will form a band. Research is are made in order to accomplish perfect zero-absorption by means of EIT, by using semiconductor quantum wells or impurities whose energy is relatively discrete in solids. See, for example, A. Imamoglu et al., Opt. Lett. 19, 1744 (1994); P. J. Harshman et al., IEEE J. Quantum Electronics, 30, 2297 (1994); D. Huang et al., J. Opt. Soc. Am., B11, 2297 (1994); Y. Zhu et al., Phys. Rev., A49, 4016 (1994).

However, no such prominent light modulation as is observed in atom gas systems has thus far been obtained in solid systems. Some reports show that absorption did reduce, but at temperatures as low as liquid helium temperature. See H. Schmidt et al., Appl. Phys. Lett. 70, 3455 (1997); Y. Zhao et al., Phys. Rev. Lett. 79, 641 (1997): B. S. Ham et al., Opt. Lett. 22, 1138 (1997).

Why no prominent light modulation has occurred in solid systems? There seem to be two reasons. First, relaxation proceeds fast in solid systems. Second, optical transition has a great inhomogeneous broadening in solid systems.

In the case of EIT of Λ-type excitation, it is required that, as described above, excitation between level 2 (intermediate level) and level 3 (base level) be forbidden and that level 2 be in metastable state, remaining unchanged for a long time. It is further required that two light beams be equal in terms of detuning. In view of these requirements, the inhomogenous broadening of the transition must be less than the homogenous broadening thereof or Rabi frequency.

Even in a semiconductor quantum well system or impurity systems whose characteristic is relatively similar to that of atomic system, it is extremely difficult to find a three-level system having no inhomogeneous broadening and including one excited level that would not be relaxed. This may be the reason why no function element has ever been provided that has prominent light-modulating characteristic by virtue of EIT.

BRIEF SUMMARY OF THE INVENTION

The object of the present invention is to provide a function element which can operate on the basis of quantum interference effect, particularly RQB (Resonant Quantum Beat) in a solid.

To attain the object, a function element according to a first aspect of the invention comprises: a solid body including quantum structures each capable of having at least three energy levels; light-applying device to apply a first coherent light beam to the solid body to excite quantum structures between a first level and a second level lower than the first level, and applying a second coherent light beam to the solid body to excite quantum structures between the first level and a third level lower than the second level; and field-applying device to apply an external field to the solid body, thereby to excite the quantum structures between the first and second levels.

In the function element, the following conditions are satisfied:

$\sigma_{23} \leq \sigma_{12}$ and $\sigma_{23} \leq \sigma_{13}$, where $\sigma_{12}$ is standard deviation of resonance angular frequencies $\omega_{12}(i)$ between the first and second levels, $\sigma_{13}$ is standard deviation of resonance angular frequencies $\omega_{13}(i)$ between the first and third levels, and $\sigma_{23}$ is standard deviation of resonance angular frequencies $\omega_{23}(i)$ between the second and third levels, for all n number of quantum structures existing in the solid body.

The standard deviations $\sigma_{12}$, $\sigma_{13}$ and $\sigma_{23}$ are represented as follows:

$$\sigma_{12} = \{(1/n)\Sigma(\omega_{12}(i) - <\omega_{12}>)^2\}^{1/2},$$

$$\sigma_{13} = \{(1/n)\Sigma(\omega_{13}(i) - <\omega_{13}>)^2\}^{1/2},$$

$$\sigma_{23} = \{(1/n)\Sigma(\omega_{23}(i) - <\omega_{23}>)^2\}^{1/2},$$

where $<\omega_{12}>$ is an average of the resonance angular frequencies $\omega_{12}(i)(i=1$ to n), $<\omega_{13}>$ is an average of the resonance angular frequencies $(\omega_{13}(i)$ (i=1 to n), and $<\omega_{23}>$ is an average of the resonance angular frequencies $\omega_{23}(i)$ (i=1 to n).

The external field is, for example, an oscillating electric field or an oscillating magnetic field, more particularly a high-frequency electric field or a high-frequency electromagnetic field. This holds true for any other aspect of the present invention.

A function element according to a second aspect of the invention comprises: a solid body including quantum structures each capable of having at least three energy levels; light-applying device to apply a first coherent light beam to the solid body in order to excite quantum structures between a second level and a third level lower than the second level, and applying a second coherent light beam to the solid body in order to excite quantum structures between a first level and the third level lower than the first level; and field applying device to apply an external field to the solid body, thereby to excite the quantum structures between the first and second levels.

In this function element, the following conditions are satisfied:

$\sigma_{12} \leq \sigma_{13}$ and $\sigma_{12} \leq \sigma_{23}$, where $\sigma_{12}$ is standard deviation of resonance angular frequencies $\omega_{12}(i)$ between the first and second levels, $\sigma_{13}$ is standard deviation of resonance angular frequencies $\omega_{13}(i)$ between the first and third levels, and $\sigma_{23}$ is standard deviation of resonance angular frequencies $\omega_{12}(i)$ between the second and third levels, for all n number of quantum structures existing in the solid body.

The standard deviations $\sigma_{12}$, $\sigma_{13}$ and $\sigma_{23}$ are represented as follows:

$$\sigma_{12} = \{(1/n)\Sigma(\omega_{12}(i) - <\omega_{12}>)^2\}^{1/2},$$

$$\sigma_{13} = \{(1/n)\Sigma(\omega_{13}(i) - <\omega_{13}>)^2\}^{1/2},$$

$$\sigma_{23} = \{(1/n)\Sigma(\omega_{23}(i) - <\omega_{23}>)^2\}^{1/2},$$

where $<\omega_{12}>$ is an average of the resonance angular frequencies $\omega_{12}(i)$ (i=1 to n), $<\omega_{13}>$ is an average of the resonance angular frequencies $\omega_{13}(i)$ (i=1 to n), and $<\omega_{23}>$ is an average of the resonance angular frequencies $\omega_{23}(i)$ (i=1 to n).

A function element according to a third aspect of the invention if of the type according to the first aspect. In this function element, the phase of the external field can be changed before the field-applying means applies to the solid body the first and second coherent light beams for exciting the quantum structures between the first and second levels and the quantum structures between the first and third levels, respectively. The intensities of the first and second coherent light beams passing through the solid body and the intensity of a light beam emitted from the first level change when the phase of the external field is so changed.

A function element according to a fourth aspect of the invention is of the type according to the second aspect. In the function element, the phase of the external field can be changed before the field-applying means applies to the solid body the first and second coherent light beams for exciting the quantum structures between the second and third levels and the quantum structures between the first and third levels, respectively, and the intensities of the first and second coherent light beams passing through the solid body and the intensities of light beams emitted from the first and second levels, respectively, change when the phase of the external field is so changed.

A function element according to a fifth aspect of the invention is of the type according to the first aspect. It is characterized in that the solid body has a resonator which has a pair of mirrors, and the field-applying means applies the external field to the solid body, thereby to emit at least one of the coherent light beams in the form of a laser beam, while the first and second coherent light beams for exciting the quantum structures between the first and second levels and the quantum structures between the first and third levels, respectively, remain in the solid body.

A function element according to a sixth aspect of the invention is of the type according to the second aspect. This element is characterized in that the solid body has a resonator which has a pair of mirrors, and the field-applying means applies the external field to the solid body, thereby to emit at least one of the coherent light beams in the form of a laser beam, while the first and second coherent light beams for exciting the quantum structures between the second and third levels and the quantum structures between the first and third levels, respectively, remain in the solid body.

A function element according to a seventh aspect of the invention is of the type according to the first, third or fifth aspect. In the function element, quantum structures existing in the solid body are transition metal ions each having n number of electrons in d shell (n=1 to 9) or a rare earth ions each having m number of electrons in f shell (M=1 to 13); the second and third levels of the transition metal ions are selected from levels divided from one level by spin-orbit interaction, hyper-fine coupling or nuclear quadrupole interaction; and the second and third levels of the rare earth ions are selected from levels divided from one level by hyper-fine coupling or nuclear quadrupole interaction.

The second and third levels of the transition metal ions are, more specifically, two levels in hyperfine structures, which can be excited with electromagnetic waves whose frequencies fall within a range of $10^5$ to $10^{12}$ Hz.

A function element according to an eighth aspect of the invention is of the type according to the second, fourth or sixth aspect. In this function element, the quantum structures existing in the solid body are transition metal ions each having n number of electrons in d shell (n=1 to 9) or a rare earth ions each having m number of electrons in f shell (m=1 to 13); the first and second levels of the transition metal ions are selected from levels divided from one level by spin-orbit interaction, hyper-fine coupling or nuclear quadrupole interaction; and the first and second levels of the rare earth ions are selected from levels divided from one level by hyper-fine coupling or nuclear quadrupole interaction.

The first and second levels of the transition metal ions are, more specifically, two levels in hyperfine structures, which can be excited with electromagnetic waves whose frequencies fall within a range of $10^5$ to $10^{12}$ Hz.

The inventors hereof have conducted research, the results of which are the basis of the present invention. The results of the research, which is the basis of the present invention, will be explained before the function element of the invention.

The inventors are interested in so-called "resonant quantum beat" which is a phenomenon. This phenomenon serves to induce a quantum interference effect. (The phenomenon, abbreviated as "RQB," is a new one and has yet to have a generally accepted name. O. Scully, who has proposed this phenomenon, calls it "quantum beat" in his thesis (Phys. Rev. Lett. 62, 2813 (1989). To avoid confusion with any other similar phenomenon, the phenomenon is now called "resonant quantum beat".

Only the theoretical aspect of RQB has been known. (See J. A. Bergou et al., Phys. Rev. A43, 4889 (1991); F. L. Kien et al., Phys. Rev. A51, 1644 (1995); M. A. G. Martinez et al., Phys. Rev. A55, 4483 (1997); P. Bogar et al., Phys. Rev. A56, 1012 (1997).) Very recently it was found that RQB induced in an atom gas system. (See N.Ph. Georgiades et al., Opt. Lett. 21, 1688 (1996); N.Ph. Georgiades et al., Phys. Rev. A55, R1605 (1997); D. V. Kosaciov, Opt. Commun. 151, 35 (1997).)

The quantum interference effect induced by RQB will be explained, along with LWI.

Like EIT, RQB occurs in a three-level system. RQB differs from EIT in two respects. First, it causes closed triple excitation when coherent electromagnetic waves are applied to all three transitions. Second, a quantum interference effect is obtained even if relaxation takes place at all three levels.

At present, the optical characteristic of RQB is not so well known as that of EIT. To demonstrate the optical characteristic of RQB thereby to compare it with the optical characteristic of EIT, one of the three electromagnetic waves is applied outside the three-level system. It is then confirmed that RQB can define three schemes, i.e., Λ-type excitation, V-type excitation and Ξ-type excitation, all described above, as is illustrated in FIGS. 6A to 6C.

In Λ-type excitation, for example, a quantum interference effect is thought to be induced by interference between a one-photon transition from level 3 to level 1 and a two-photon transition. The one-photon transition has been caused by the light beam 2, and the two-photon transition has been caused by the light beam 2 and an outer field.

Whether the interference is weakened or strengthened depends the phase θ between the beats of light beams 1 and 2 and the external field. The absorption-emission characteristic the light with respect to the phase θ can be determined by analyzing the density matrix, in the same way as in the case of EIT.

It will be explained what kind of an interference effect is induced by Λ-type excitation performed in a three-level system by changing the phase θ, if the relaxation rate of the system is higher than the Rabi frequency of the external field.

For the sake of simplicity, it is assumed that the three electromagnetic waves are all resonant with each transition (that is, the detuning is zero) and that the three levels have the same relaxation rate. (Needless to say, a quantum interference effect is induced even if no relaxation occurs between the two lower levels excited by the external field.) The amount of the light beam 1, the amount of the light beams and the total amount of beams 1 and 2, all absorbed during each unit time are recorded, and the amount of light emitted from level 1 only for the unit time is recorded.

FIG. 7A shows the relationship between the phase θ and the total amount of two beams absorbed when the relaxation rate is higher than the Rabi frequency. FIG. 7B shows the relationship between the phase θ and the total amount of two beams emitted when the relaxation rate is higher than the Rabi frequency.

As seen from FIGS. 7A and 7B, both the absorption and the emission largely depend on the phase θ and changes in the same manner in each cycle π. More precisely, the absorption and the emission increase at phases of π/2 and 3π/2, whereby the two transitions strengthen each other. By contrast, the absorption and the emission decrease at phases of 0 and π, whereby the two transitions weaken each other.

The Rabi frequency of the external field is given as ($\Omega_{ext}$ ext(jθ), and the amount of light absorbed and the amount of light emitted can be expressed in the same functional form of $C/(A+B (\Omega ext^2 \sin^2 \theta))$. Both the amount of light absorbed and the amount of light emitted fluctuate. This is because an imaginary-number part works which corresponds to the incoherent pumping or damping region of the Rabi frequency of the external frequency.

As the external field is intensified, thus increasing the Rabi frequency, the amount of light absorbed and the amount of light emitted decrease quickly and no longer fluctuate. The system becomes transparent as a whole. If the Rabi frequency of the external field is higher than the relaxation rate, a gain is obtained in accordance with the phase θ, without inverting the distribution of electrons.

FIG. 8A shows how a gain is obtained when the phase θ is π/2. FIG. 8B shows how a gain is obtained when the phase θ is 3π/2. As is evident from FIGS. 8A and 8B, the transition which generates a gain is switched in accordance with the phase θ.

The gain is generated if the population at level 1 which is the highest level is smaller than that at the lower level 2 or 3. RQB can, therefore, serve to provide an LWI laser.

The absorbed amounts of the light beams 1 and 2 can be functional forms, $(j\ \Omega_1\ \Omega_2/\Omega_{ext} \sin \theta)$ and $-(j\ \Omega_1\ \Omega_2/\Omega ext \sin \theta)$, respectively. This means that any transition gives forth a gain at any phase θ, but not at two phases of 0 and π.

Absorption-emission characteristic similar to the one observed in Λ-type excitation could be attained also in V-type excitation and Ξ-type excitation, by analyzing the density matrix. However, it has not been determined yet why a gain is obtained without inverting the distribution of electrons by virtue of RQB, to render LIW possible.

As may be understood from the principle of RQB, described above, semiconductor quantum wells or impurities whose energy is relatively discrete must be used in RQB, too, in order to accomplish quantum interference.

Quantum interference is hardly induced by EIT if relaxation occurs at all three levels. In RQB, quantum interference may take place even if relaxation occurs at all three levels. Namely, relaxation need not be restricted in RQB so much as in EIT. In view of this, RQB can be a scheme suitable for use in solid systems. If the system wherein RQB is taking place has inhomogeneous broadening, however, RQB can achieve but such a small light-modulating characteristic as EIT attains.

FIG. 9 shows conditions for the detuning of quantum interference induced by RQB. In FIG. 9, the photon energy 2 of the light beam 2 (FIG. 6A) is plotted on the abscissa, the photon energy of the light beam 1 (FIG. 6A) on the ordinate, and the energy level of the atom gas is plotted in the two-dimensional plane defined by the abscissa and ordinate.

The inhomogeneous broadening of the atom gas is almost zero. Groups of atoms are therefore located at a point ($\omega_{13}$, $\omega_{12}$) in the two-dimensional plane. The lines extending from the point ($\omega_{13}$, $\omega_{12}$) in various directions represent the conditions for the detuning of quantum interference. Of these lines, the solid line indicates two detuning conditions, $\delta\omega_1 =_{67} \omega_2$ and $\delta\omega_{ext}=0$. These conditions correspond to the condition $\delta\omega_1 = \delta\omega_2$ for EIT. Conditions, $\delta\omega_1 = \delta\omega_2$ and $\delta\omega_{ext}=0$, mean that the atoms can be set into quantum interference by applying two light beams and an external field whose wavelengths are such that the group of atoms are located at any point on the solid line.

As seen from FIG. 9, the quantum interference effect can hardly be observed in a solid system wherein the three levels greatly differ, though the effect is induced by RQB. This problem can be solved by decreasing the inhomogeneous broadening of energy levels in the solid to a value approximately equal to the inhomogeneous broadening of energy levels in the atom gas. With the existing element-manufacturing techniques, however, it is difficult to decrease that inhomogeneous broadening so much.

The function element according to the present invention will now be described. The function element of this invention is characterized in the following respect. Two of the three optical transitions in a solid are excited with light by means of $\Lambda$-type excitation or V-type excitation. Further, an external field such as an oscillation electric field or an oscillation magnetic field is applied to the excitation between the two lower levels or the two upper levels through an electrode, an electromagnet or a cavity resonator. Before applying the external field, the transition between the levels to be excited with the external field is compared with the transition between the levels to be excited with light, thereby determining which transition has a larger energy distribution (inhomogeneous broadening).

The size of the inhomogeneous broadening of transition in the solid can be estimated from the interaction of the impurities contained in the solid. How to estimate the size of the inhomogeneous broadening will be explained, taking rare-earth ions for example.

Representative as the interaction of rare-earth ions in a solid are: spin-orbit interaction, crystal field, f electron-nuclear hyperfine coupling, nuclear, quadrupole interaction nuclear, and the like.

The following equation represents Hamiltonian interaction. (Hereinafter, only Hamiltonian interaction $H_{INT}$ will be discussed, but Hamiltonian interaction $H_0$ of bare atoms will not be discussed.)

$$H_{INT}=H_{SO}+H_{CF}+H_{HF}+H_Q \quad (1)$$

where $H_{SO}$, $H_{CF}$, $H_{HF}$ and $H_Q$ are four Hamiltonian interactions, respectively, i.e., spin-orbit interaction, a crystal field, f electron-nuclear hyperfine coupling, and nuclear quadrupole interaction.

The number of energy levels the impurities assume in the solid and the positions these levels take in the solid depend on the magnitudes of these interactions. For rare-earth ions, it is known that the magnitudes of the interactions generally have the relationship of: $H_{SO}>H_{CF}>H_{HF}>H_Q$. Namely, the crystal field $H_{CF}$ which is specific to solids has the second greatest magnitude. Thus, the energy levels of the rare-earth ions in a solid coincide, though roughly, with the energy levels of free ions.

$H_{CF}$, $H_{HF}$ and $H_Q$, which are weak interactions, divide each energy level obtained by dividing an energy level by $H_{SO}$, into sub-levels. The sub-levels depend on the magnitudes of the interactions, too. Therefore, the sub-levels also have the relationship of:

$H_{CF}>H_{HF}>H_Q$.

These three interactions, i.e., $H_{CF}$, $H_{HF}$ and $H_Q$, will be studied in detail. The crystal field $H_{CF}$ is expressed as follows:

$$H_{CF}=\Sigma\Sigma(-eQ_j/|r_i-R_j|) \quad (2)$$

where $r_i$ is the position vector of the ith f electron of a rare-earth ion, and $R_j$ is the position vector of the jth coordinating ion (atom ion of the matrix) surrounding the rare-earth ion, and $\Omega j$ is the electric charge of the jth coordinating ion. Ri and Rj are given as follows:

$R_i=(r_i, \theta_i, \phi_i)$ $R_j=(r_j, \theta_j, \phi_j)$.

FIG. 10 shows a simple solid system. In this system, a rare-earth ion having one f electron is surrounded by coordination ions (each having electric charge of $-Ze$) which are arranged in cubic symmetry. In other words, the f electron is located in a crystal field of cubic symmetry. The potential energy VCF of the f electron can be expressed as follows:

$$V_{CF}=A_{00}+A_{40}D_0(^4)+(A_{44}D_4(^4)+A_{4-4}D_{-4}(^4))+A_{60}D_0(^6)+(A_{64}D_4(^6) \\ +A_{6-4}D_{-4}(^6))+ \quad (3)$$

$A_{00}=6\ Ze^2/a$ $A_{40}=7\ Ze^2/2a^5$ $A_{44}=A_{4-4}=(35)^{1/2}Ze^2/(8)^{1/2}a^5$ $A_{60}=3\ Ze^2/2a^7$ $A_{64}=A_{6-4}=(63)^{1/2}Ze^2/(32)^{1/2}a^7$ $D_p^{(t)}=\Sigma r_i^t C_p^{(t)}(\theta_i, \phi_i)$ $C_p^{(t)}(\theta_i, \phi_i)=(4\pi/(2t+1))^{1/2}Y_{tp}(\theta, \phi)$ where a is the distance between the rare-earth ion and the coordination ions, and $Y_{tp}(\theta,\phi i)$ is spherical function.

The equation (3) shows that the energy difference between any two levels split from one level by the crystal field greatly depends on the distance a between the rare-earth ion and coordination ion. It is known that, also in the case of a system in which coordination ions are arranged less symmetrically than in the system of FIG. 10, the energy difference between any two levels split from one level by the crystal field greatly depends on the distance a between the rare-earth ion and each coordination ion.

The hyperfine-coupling $H_{HF}$ and the nuclear quadrupole interaction $H_Q$ are expressed as follows:

$$H_{HF}=A_j I \cdot J_{lm} \quad (4a)$$

$$H_Q=P\{(I_z^2-I(I+1)/3)+(\eta/3)(I_x^2-I_y^2)\} \quad (4b)$$

where J is the total angular momentum of an electron, I is the spin angular momentum of an nucleus, $A_j$ is the constant of the hyperfine coupling, $\eta$ is the constant of the quadrupole interaction, n is the parameter indicating the asymmetry of the electric field gradient (EFG), and (x, y, z) is the major axis of EFG tensor.

As can be seen from the equations (4a) and (4b), the energy difference between the levels split from a level by either the hyperfine coupling or the nuclear quadrupole interaction basically does not depend on the distance a between the rare-earth ion and each coordination ion, unlike the energy difference between any two levels split from one level. It is known that generally, the absorption spectrum of the rare-earth ions in a solid generally has an inhomogeneous broadening. The inhomogeneous broadening is inevitable because the microscopic electric field (i.e., crystal field) in the solid differs from ion to ion due to the local strains in the solid. This means that the distance a differs from rare-earth ion to each coordination.

Hence, to achieve a quantum interference effect by using rare-earth impurities in a solid, two levels are selected from the levels split from one level by f electron-nuclear hyperfine coupling or nuclear quadrupole interaction (not by crystal field or spin-orbit interaction). The two levels thus selected are used as the lower two levels in Λ-type excitation, or as the upper two levels in V-type excitation, specifically reduce the inhomogeneous broadening between the two levels. The conditional expressions described above in connection with the first and second aspects of the invention can, therefore, be satisfied.

In a system wherein transition metal ions are dispersed in a solid, the magnitudes of the interactions generally have the relationship of: $H_{CF} > H_{SO} > H_{HF} > H_Q$, unlike in a system where rare-earth ions are dispersed. Therefore, to achieve a quantum interference effect by using the transition metal ions, two levels are selected from the levels split from one level by spin-orbit interaction, d electron-nuclear hyperfine coupling or nuclear quadrupole interaction, (not by crystal field). The two levels thus selected are used as the lower two levels or as the upper two levels, specifically reduce the inhomogeneous broadening between the two levels. In this case, too, the conditional expressions described above in connection with the first and second aspects of the invention can be satisfied.

Among solid materials which satisfy the conditional expressions are compounds which contain, as impurities, at least one element selected from primary transition metal elements such as Ti, V, Cr, Mn, Fe, Co, Ni and Cu; secondary transition metal elements such as Zr, Nb, Mo, Tc, Ru, Rh, Pd and Ag; tertiary transition metal elements such as Hf, Ta, W, Re, Os, Ir, Pt and Au; lanthanoid rare-earth elements such as Ce, Pr, nd, Sm., Eu, Gd, Tb, Dy, Ho, Er, Tm and Yb; and actinoid rare-earth elements such as Th, Pa and U. These compounds are: LiF, NaF, KF, RbF, CsF, $MgF_2$, $CaF_2$, $SrF_2$, $BaF_2$, $MnF_2$, $ZnF_2$, $CdF_2$, $AlF_3$, $YF_3$, $LaF_3$, $CeF_3$, $PrF_3$, $NdF_3$, $SmF_3$, $EuF_3$, $GdF_3$, $TbF_3$, $DyF_3$, $HoF_3$, $ErF_3$, $TmF_3$, $YbF_3$, $LuF_3$, $LiBaF_3$, $KMgF_3$, $KMnF_3$, $KZnF_3$, $KNiF_3$, $RbNiF_3$, $ZrF_4$, $LiYF_4$, $NaYF_4$, $KYF_4$, $LiLaF_4$, $LiGdF_4$, $LiLuF_4$, $BaAlF_5$, $SrAlF_5$, $K_3F_6$, $K_3CoF_6$, $Cs_3NdF_7$, $Cs_3GdF_7$, LiCl, NaCl, KCl, RbCl, CsCl, $YCl_3$, $LaCl_3$, $CeCl_3$, $PrCl_3$, $NdCl_3$, $SmCl_3$, $EuCl_3$, $GdCl_3$, $TbCl_3$, $DyCl_3$, $HoCl_3$, $ErCl_3$, $TmCl_3$, $YbCl_3$, $LuCl_3$, $CsMgCl_3$, $CsCdCl_3$, LiBr, NaBr, KBr, RbBr, CsBr, $YBr_3$, $LaBr_3$, $CeBr_3$, $PrBr_3$, $NdBr_3$, $SmBr_3$, $EuBr_3$, $GdBr_3$, $TbBr_3$, $DyBr_3$, $HoBr_3$, $ErBr_3$, $TmBr_3$, $YbBr_3$, $LuBr_3$, $CsMgBr_3$, LiI, NaI, KI, RbI, CsI, CuCl, CuBr, CuI, AgF, AgCl, AgBr, AgI, YOCl, LaOCl, LaOBr, TlCl, TlBr, TlI, InBr, InI, $Li_2O$, BeO, $N_2O_5$, $Na_2O$, $P_2O_3$, $S_2O_3$, $K_2O$, CaO, $Cr_2O_3$, $MnO_2$, CoO, NiO, SrO, $ZrO_2$, $Nb_2O_5$, $MoO_3$, AgO, $Sb_2O_3$, $TeO_2$, BaO, $WO_3$, $Re_2O_7$, PbO, $PuO_2$, $Y_2O_3$, $La_2O_3$, $Ce_2O_3$, $Pr_2O_3$, $Nd_2O_3$, $Sm_2O_3$, $Eu_2O_3$, $Gd_2O_3$, $Tb_2O_3$, $DY_2O_3$, $Ho_2O_3$, $Er_2O_3$, $Tm_2O_3$, $Yb_2O_3$, $Lu_2O_3$, $ThO_2$, $UO_2$, $UO_3$, $Ba_2GdNbO_5$, $SrGdGa_3O_7$, $Sc_2Gd_3Ga_3O_{12}$, $NaLuO_{12}$, $LiIO_3$, $LiNbO_3$, $LiTaO_3$, $Ba_2NaNb_5O_{15}$, $Y_2O_2S$, $La_2O_2S$, $Ce_2O_2S$, $Pr_2O_2S$, $Nd_2O_2S$, $Sm_2O_2S$, $Eu_2O_2S$, $Gd_2O_2S$, $Tb_2O_2S$, $DY_2O_2S$, $Ho_2O_2S$, $Er_2O_2S$, $Tm_2O_2S$, $Yb_2O_2S$, $Lu_2O_2S$, $Y_2S_3$, $La_2S_3$, $Ce_2S_3$, $Pr_2S_3$, $Nd_2S_3$, $Sm_2S_3$, $EU_2S_3$, $Gd_2S_3$, $Tb_2S_3$, $Dy_2S_3$, $Ho_2S_3$, $Er_2S_3$, $Tm_2S_3$, $Yb_2S_3$, $Lu_2S_3B_2S_3$, $GaBO_3$, $InBO_3$, $TlBO_3$, $ScBO_3$, $YBO_3$, $LaBO_3$, $CeBO_3$, $PrBO_3$, $NdBO_3$, $SmBO_3$, $EuBO_3$, $GdBO_3$, $TbBO_3$, $DyBO_3$, $HoBO_3$, $ErBO_3$, $TmBO_3$, $YbBO_3$, $LuBO_3$, $CaYBO_4$, $BaB_2O_4$, $Cd_2B_2O_5$, $LiB_3O_5$, $CSB_3O_5$, $SrB_4O_7$, $Al_3TbB_4O_{12}$, ZnO, $ZnGa_2O_4$, MgO, $MgGa_2O_4$, $Mg_2TiO_4$, $Mg_4Ta_2O_9$, $TiO_2$, $CaTiO_3$, $SrTiO_3$, $BaTiO_3$, $PbTiO_3$, $KTiPO_5$, $Al_2O_3$, $LiAlO_2$, $YAlO_3$, $BeAl_2O_4$, $MgAl_2O_4$, $ZnAl_2O_4$, $LiAl_5O_8$, $Y_4Al_2O_9$, $YAl_3B_4O_{12}$, $Y_3Al_5O_{12}$, $La_3Al_5O_{12}$, $Ce_5Al_5O_{12}$, $Pr_3Al_5O_{12}$, $Nd_3Al_5O_{12}$, $Sm_3Al_5O_{12}$, $Eu_3Al_5O_{12}$, $Gd_3Al_5O_{12}$, $Tb_3Al_5O_{12}$, $Dy_3Al_5O_{12}$, $Ho_3Al_5O_{12}$, $Er_3Al_5O_{12}$, $Tm_3Al_5O_{12}$, $Yb_3Al_5O_{12}$, $Lu_3Al_5O_{12}$, $LaAl_{11}O_{18}$, $CeMgAl_{11}O_{19}$, $TbMgAl_{11}O_{19}$, $BaAl_{12}O_{19}$, $BaMg_2Al_{16}O_{27}$, $Fe_2O_3$, $Y_3Fe_5O_{12}$, $La_3Fe_5O_{12}$, $Ce_3Fe_5O_{12}$, $Pr_3Fe_5O_{12}$, $Nd_3Fe_5O_{12}$, $Sm_3Fe_5O_{12}$, $Eu_3Fe_5O_{12}$, $Gd_3Fe_5O_{12}$, $Tb_3Fe_5O_{12}$, $Dy_3Fe_5O_{12}$, $Ho_3Fe_5O_{12}$, $Er_3Fe_5O_{12}$, $Tm_3Fe_5O_{12}$, $Yb_3Fe_5O_{12}$, $Lu_3Fe_5O_{12}$, $Y_3Ga_5O_{12}$, $La_3Ga_5O_{12}$, $Ce_3Ga_5O_{12}$, $Pr_3Ga_5O_{12}$, $Nd_3Ga_5O_{12}$, $Sm_3Ga_5O_{12}$, $Eu_3Ga_5O_{12}$, $Gd_3Ga_5O_{12}$, $Tb_3Ga_5O_{12}$, $Dy_3Ga_5O_{12}$, $Ho_3Ga_5O_{12}$, $Er_3Ga_5O_{12}$, $Tm_3Ga_5O_{12}$, $Yb_3Ga_5O_{12}$, $Lu_3Ga_5O_{12}$, $Y_3Sc_2Ga_5O_{12}$, $CaPO_3$, $ScPO_4$, $YPO_4$, $LaPO_4$, $CePO_4$, $PrPO_4$, $NdPO_4$, $EuPO_4$, $GdPO_4$, $TbOP_4$, $DyPO_4$, $HoPO_4$, $ErPO_4$, $TmPO_4$, $YbPO_4$, $LuPO_4$, $Ca_2PO_4Cl$, $Mg_3(PO_4)_2$, $Ca_3(PO_4)_2$, $Sr_3(PO_4)_2$, $Ba_3(PO_4)_2$, $Zn_3(PO_4)_2$, $Cd_3(PO_4)_2$, $Mg_5(PO_4)_3F$, $Mg_5(PO_4)_3Cl$, $Ca_5(PO_4)_3F$, $Ca_5(PO_4)_3Cl$, $Sr_5(PO_4)_3F$, $Sr_5(PO_4)_3Cl$, $Ba_5(PO_4)_3F$, $Ba_5(PO_4)_3Cl$, $Sr_2P_2O_7$, $NdP_5O_{14}$, $SiO_2$, $BeSiO_3$, $MgSiO_3$, $CaSiO_3$, $SrSiO_3$, $BaSiO_3$, $ZnSiO_3$, $CdSiO_3$, $Zn_2SiO_4$, $NaYSiO_4$, $Y_2SiO_5$, $La_2SiO_5$, $Lu_2SiO_5$, $BeSi_2O_5$, $MgSi_2O_5$, $CaSi_2O_5$, $SrSi_2O_5$, $BaSi_2O_5$, $Sc_2Si_2O_7$, $Be_2SrSi_2O_7$, $Ca_2MgSi_2O_7$, $Si_3N_4$, $GeO_2$, $Zn_2GeO_4$, $Cs_2UO_2F_4$, $Cs_2UO_2Cl_4$, $Cs_2UO_2Br_4$, $Cs_3UO_2F_5$, $Cs_3UO_2Cl_5$, $Cs_3UO_2Br_5$, $MgWO_4$, $CaWO_4$, $SrWO_4$, $BaWO_4$, $AlWO_4$, $CdWO_4$, $PbWO_4$, $Y_2WO_6$, $MgMoO_4$, $CaMoO_4$, $SrMoO_4$, $BaMoO_4$, $Li_2MoO_4$, $Y_2MO_3O_{12}$, $La_2Mo_3O_{12}$, $Ce_2Mo_3O_{12}$, $Pr_2Mo_3O_{12}$, $Nd_2Mo_3O_{12}$, $Sm_2Mo_3O_{12}$, $Eu_2Mo_3O_{12}$, $Gd_2Mo_3O_{12}$, $Tb_2Mo_3O_{12}$, $DY_2Mo_3O_{12}$, $Ho_2Mo_3O_{12}$, $Er_2Mo_3O_{12}$, $Tm_2Mo_3O_{12}$, $Yb_2Mo_3O_{12}$, $Lu_2Mo_3O_{12}$, $NaCaVO_4$, $ScVO_4$, $YVO_4$, $Mg_3(VO_4)_2$, $Ca_3(VO_4)_2$, $Sr_3(VO_4)_2$, $Ba_3(VO_4)_2$, $Zn_3(VO_4)_2$, $Cd_3(VO_4)_2$, $Mg_5(VO_4)_3F$, $Mg_5(VO_4)_3Cl$, $Ca_5(VO_4)_3F$, $Ca_5(VO_4)_3Cl$, $Sr_5(VO_4)_3F$, $Sr_5(VO_4)_3Cl$, $Ba_5(VO_4)_3F$, $Ba_5(VO_4)_3Cl$, CaS, SrS, BaS, CaSe, BaSe.

Also among the solid materials which satisfy the conditional expressions are insulating inorganic materials such as fluoride, halogen, bromide, iodide, copper halide, silver halide, acid halide, thallium compound, indium compound, lead borate, zinc oxide, magnesium oxide, titanium oxide, aluminate, garnet, silicate, germanate, yttrium compound, lanthanum compound, cerium compound, praseodymium compound, neodymium compound, samarium compound, europium compound, dadolinium compound, terbium compound, dysprosium compound, holmium compound, erbium compound, thulium compound, ytterbium compound, lutetium compound, uranium compound, phosphate, shale compound, sulfide, selenide, and the like.

Other materials that can be used as solid materials which satisfy the conditional expressions are semiconductor materials and semi-insulating materials, such as diamond, Si, SiC, SiGe, Ge, GaAs, GaP, GaN, GaSb, AlAs, AlP, AlN, AlSb, InAs, InP, InSb, HgS, HgSe, HgTe, BaS, BP, BN, ZnS, AnSe, ZnTe, CdS, CdSe, CdSe, CdTe, $Cu_2O$, $SnO_2$, $In_2O_3$.

In the materials mentioned above, the transition metal element or the rare-earth element exits, generally in the form of ions. Nonetheless, the valence of the element is not limited.

If the non-homogeneity of energy levels decreases to a value similar to the non-homogeneity of atom gas, thanks to the advance of the technology of manufacturing semiconductor elements, use can be made of semiconductor quantum structures such as superlattices, quantum wire and quantum dots.

In the present invention, various. energy transitions excited with light are performed. To excite primary transition metal ions, d—d transition is carried out which involves 3d level of these ions. To excite secondary transition metal ions, d—d transition is carried out which involves 4d level of these ions. To excite tertiary transition metal ions, d—d transition is carried out which involves 5d level of these ions. To excite lanthanoid rare-earth ions, f—f transition is carried out which involves 4f and 5d levels. To excite actinoid rare-earth ions, f—f transition is carried out which involves 5f level.

As excitation light, a coherent light beam, or a laser beam, is applied. The laser for emitting the excitation light is not limited to a specific type. It is desired, however, that a semiconductor laser be used which is fit to manufacture small function elements.

An oscillation electric field may be used as external field. If so, it is desired that an electric field be applied to a solid by means of a pair of electrodes which serve to manufacture small function elements. Alternatively, an oscillation magnetic field may be used as external field. In this case, it is desired that a magnetic field be applied to the solid by means of a pair of electromagnets or a cavity resonator which has a small hole for guiding a laser beam.

Having the structure described above, the function element according to the present invention can induce a prominent quantum interference effect by virtue of RQB, even in a solid which has a large inhomogeneous broadening. How the effect is caused will be explained in detail.

As indicated above, it is difficult to use such a level as would form a band that achieve RQB in a solid. Therefore, a solid which has discrete levels, like atom gas, must be selected. Further, it is required that the solid be a closed system which has a simple level structure and in which three levels can be set and electrons would not escape from these levels.

Solids that can be used to provide the function element of the invention include a system containing rare-earth ions or transition metal ions dispersed in a crystal and a system containing semiconductor quantum wells, semiconductor quantum wires or quantum dots.

A solid characterized by having such energy levels as described above can be regarded as a group of pseudo-atoms. In a pseudo-atom system, however, optical transition has not been so remarkably modulated as in atom gas. This is because the energy levels of the pseudo-atoms are dispersed less homogeneously than in an atom gas system. Consequently, the number of pseudo-atoms is not large enough to meet the RQB-inducing conditions of $\delta\omega_1 = \delta\omega_2$ and $\delta\omega_{ext} = 0$. (These conditions are RQB detuning conditions and indicated by the solid line in FIG. 9. They are the same in Λ-type excitation and V-type excitation.)

Thus, not only the above-mentioned but also conditions relating to the homogeneity of energy levels need to be satisfied in order to induce RQB in a solid.

FIG. 11 is a graph representing the absorption spectrum of a solid system in which pseudo-atoms have discrete energy levels. Generally, the absorption spectrum of such a solid has a much greater line width than the absorption spectrum of atom gas. This large line width results, in most cases, from the inhomogeneous broadening of the solid. As shown in FIG. 11, the energy levels of atoms differ a little, but not so much as to be separated from one another. Hence, the homogeneous broadening appears as a single spectral line consisting of many overlapping spectra of the pseudo-atoms.

This broadening is inevitably mainly because the crystal fields applied to the pseudo-atoms in the crystal differs in intensity due to strains in the solid, particularly in crystals. Namely, the inhomogeneous broadening is caused by the transition energies are dispersed in the whole system of pseudo-atoms. It should be noted that any pseudo-atom system described above has an inhomogeneous broadening, though the inhomogeneous broadening of one system differs from that of another.

From pseudo-atoms there may be selected a threelevel system in which the three transitions all have a large inhomogeneous broadening. FIG. 12A shows the relationship between the phase θ and the total amount of two beams absorbed for a unit time when two light beams and one external field are applied in the a three-level system, while the relaxation rate is higher than the Rabi frequency. FIG. 12B shows the relationship between the phase θ and emission intensity from pseudo-atoms for a unit time when two light beams and one external field are applied in the theelevel system, while the relaxation rate is higher than the Rabi frequency.

As is evident from FIGS. 12A and 12B, no oscillating structure having a cycle is observed, and the optical transition is scarcely modulated. This means that RQB cannot be accomplished in any pseudo-atomic system unless inhomogeneous broadening is not take into considerations.

It will now be described how the light-modulating characteristics, such as absorption and emission, based on RQB depend on the transition energy distribution of the pseudo-atomsystem, more precisely on the standard deviation of the transition energies, in Λ-type excitation and V-type excitation.

In the following description, the standard deviation of the transition energies will be used as a typical example of a physical value which represents an inhomogeneous broadening.

(1) In Λ-Type Excitation

Assume that there are two pseudo-atoms i and j, and that three coherent electromagnetic waves having respectively photon energies $\omega_1$, $\omega_2$ and Oext are applied between levels 1 and 2, between levels 1 and 3, and between levels 2 and 3. Photon energy $\omega_1$ is equal to the sum of photon energies $\omega_2$ and $\omega_{ext}$, namely $\omega_1 = \omega_2 + \omega_{ext}$.

The difference between photon energy $\omega_1$ and the transition energy $\omega_{12}$ of the levels 1 and 2 is $\delta\omega_1$ ($=\omega_1-\omega_{12}$). The difference between photon energy $\omega_2$ and the transition energy $\omega_{13}$ of the levels 1 and 3 is $\delta\omega_2$ ($=\omega_2-\omega_{13}$). The difference between photon energy $\omega_{ext}$ and the transition energy $\omega_{23}$ of the levels of 2 and 3 is $\delta\omega_{ext}$ ($=\omega_{ext}-\omega_{23}$). The condition for the two pseudo-atoms i and j to satisfy two conditions of $\delta\omega_1 = \delta\omega_2$ and $\delta\omega_{ext} = 0$ at the same time is as follows:

$$\omega_{23}(i) = \omega_{23}(j) \tag{5}$$

That is, to make the pseudo-atoms i and j satisfy the conditions of $\delta\omega_1 = \delta\omega_2$ and $\delta\omega_{ext} = 0$ at the same time, thereby to induce complete quantum interference, two conditions must be satisfied. First, the light-modulating characteristics should not depend on the position of the highest level 1. Second, the energy $\omega_{23}$ between the two lower levels should be the same for both pseudo-atoms i and j.

The difference between the transition energy $\omega_{12}(i)$ for the pseudo-atom i and the transition energy $\omega_{12}(i)$ for the pseudo-atom j is $\delta\omega_{12}$ ($=|\omega_{12}(i)-\omega_{12}(j)|$). The difference between the transition energy $\omega_{13}(i)$ for the pseudo-atom i and the transition energy $\omega_{13}(i)$ for the pseudo-atom j is $\delta\omega_{13}$ ($=|\omega_{13}(i)-\omega_{13}(j)|$). The difference between the transition energy $\omega_{23}(i)$ for the pseudo-atom i and the transition energy $\omega_{23}(j)$ for the pseudo-atom j is $\delta\omega_{23}$ ($=|\omega_{23}(i)-\omega_{23}(j)|$). Then, we obtain:

$$\delta\omega_{23} = 0 \tag{6}$$

The equation (6) is the perfect condition for inducing quantum interference. Nonetheless, quantum interference can be practically induced even if $\delta\omega_{23} \neq 0$. To be more specific, quantum interference can be induced if $\delta\omega_{23}$ is equal to or less than the Rabi frequency $\Omega_{ext}$ of the external field. Thus, the light-modulating characteristics will be improved if $\delta\omega_{23}$ satisfies the following condition when the system including the two pseudo-atoms i and j:

$$\delta\omega_{23} \leq \Omega_{ext} \quad (7)$$

It will be explained what should be satisfied to accomplish quantum interference at n number of pseudo-atoms at the same time. The condition for n number of pseudo-atoms to satisfy the conditions of $\delta\omega_1=\delta\omega_2$ and $\delta\omega_{ext}=0$ is as follows:

$$\omega_{23}(1)=\omega_{23}(2)= \ldots =\omega_{23}(n) \quad (8)$$

To induce quantum interference at n number of pseudo-atoms simultaneously, it is required that the light-modulating characteristics should not depend on the position of the highest level 1 and that the energy $\omega_{23}$ between the two lower levels should be the same for all n number of pseudo-atoms.

In this case, too, quantum interference can be practically induced even if the equation (8) is not satisfied, provided that the following standard deviations of the transition energies are introduced $$\sigma_{12}=\{(1/n)\Sigma(\omega_{12}(i)-<\omega_{12}>)^2\}^{1/2} \quad (9a)$$

$$\sigma_{13}=\{(1/n)\Sigma(\omega_{13}(i)-<\omega_{13}>)^2\}^{1/2} \quad (9b)$$

$$\sigma_{23}=\{(1/n)\Sigma(\omega_{23}(i)-<\omega_{23}>)^2\}^{1/2} \quad (9c)$$

where $<\omega_{12}>$ is the average energy between levels 1 and 2 for n number of pseudo-atoms, $<\omega_{13}>$ is the average energy between levels 1 and 3 for n number of pseudo-atoms, and $<\omega_{23}>$ is the average energy between levels 2 and 3 for n number of pseudo-atoms.

The $\Omega_{ext}$ of the external field corresponds to the energy width causing the quantum interference, and the standard deviations $\sigma_{12}$ and $\sigma_{13}$ correspond to the spectral line width of each transition. Therefore, the $\Omega_{ext}$ and the standard deviations $\sigma_{12}$ and $\sigma_{13}$ have the relationships of $\Omega_{ext} \leq \sigma_{12}$ and $\Omega_{ext} \leq \sigma_{13}$.

From the equation (7) and the equation (8), it is understood that the condition for all n number of pseudo-atoms to assume a quantum interference state is expressed as follows:

$$\sigma_{23} \leq \sigma_{12} \quad (10a)$$

$$\sigma_{23} \leq \sigma_{13} \quad (10b)$$

FIG. 13 is a schematic representation of the condition for inducing quantum interference between many pseudo-atoms at the same time. Plotted on the ordinate and abscissa are the photon energy $\omega_1$ of the light beam 1 and the photon energy $\omega_2$ of the light beam 2, respectively. The points in the two-dimensional plane represent the energy positions ($\omega_{12}$(n), $\omega_{13}$(n)) of the pseudo-atoms.

As shown in FIG. 13, the inhomogeneous broadening of $\omega_{23}$ is small for all pseudo-atoms. Thus, the pseudo-atoms that interact with the three electromagnetic waves can assume quantum interference in the case where all pseudo-atoms are distributed along the 45° line in the two-dimensional plane. Namely, it is absolutely necessary to select a system in which the inhomogeneous broadening between levels 2 and 3 is small, in order to accomplish RQB in a solid by means of Λ-type excitation.

It is known that, in the case of a rare-earth ion, the transition between two levels has a small inhomogeneous broadening in a hyperfine structure or a super hyperfine structure divided by f electron-nuclear hyper-fine coupling or nuclear quadrupole interaction (not by crystal field or spin-orbit interaction). It is also known that, in the case of a transition metal ion, the transition between two levels has a small inhomogeneous broadening in a hyperfine structure or a super hyperfine structure divided by spin-orbit interaction between d electrons, d electron-nuclear hyper-fine coupling or nuclear quadrupole interaction (not by crystal field). Hence, three levels corresponding to Λ-type excitation cab be set, for the first time, by using a solid material containing rare-earth ions or transition metal ions, the inhomogeneous broadening of which can be determined by examining the interaction of the electrons and nucleus.

(2) In V-Type Excitation Assume that there are two pseudo-atoms p and q, and that three coherent electromagnetic waves having respectively photon energies $\omega_{ext}$, $\omega_2$ and $\omega_1$ are applied between levels 1 and 2, between levels 1 and 3, and between levels 2 and 3. Photon energy $\omega_2$ is equal to the sum of photon energies $\omega_1$ and $\omega_{ext}$, namely $\omega_2=\omega_1+\omega_{ext}$.

The difference between photon energy next and the transition energy $\omega_{12}$ is $\delta\omega_{ext}$ ($=\omega_{ext}-\omega_{12}$). The difference between photon energy $\omega_2$ and the transition energy $\omega_{13}$ is $\delta\omega_2$ ($=\omega_2-\omega_{13}$). The difference between photon energy $\omega_1$ and the transition energy $\omega_{23}$ is $\delta\omega_2$ ($=\omega_1-\omega_{23}$). The condition for the two pseudo-atoms p and q to satisfy two conditions of $\delta\omega_1=\delta\omega_2$ and $\delta\omega_{ext}=0$ at the same time is as follows:

$$\omega_{12}(p)=\omega_{12}(q) \quad (11)$$

That is, to make the pseudo-atoms p and q satisfy the conditions of $\delta\omega_1=\delta\omega_2$ and $\delta\omega_{ext}=0$ at the same time, thereby to induce complete quantum interference, two conditions must be satisfied. First, the light-modulating characteristics should not depend on the position of the lowest level 3. Second, the energy $\omega_{12}$ between the two upper levels should be the same for both pseudo-atoms p and q.

As in the case of Λ-Type Excitation, the condition for all n number of pseudo-atoms to assume a quantum interference state is expressed as follows:

$$\sigma_{12} \leq \sigma_{13} \quad (12a)$$

$$\sigma_{12} \leq \sigma_{23} \quad (12b)$$

FIG. 14 is a schematic representation of the condition for inducing quantum interference between many pseudo-atoms at the same time. Plotted on the ordinate and abscissa are the photon energy $\omega_1$ of the light beam 1 and the photon energy $\omega_2$ of the light beam 2, respectively. The points in the two-dimensional plane represent the energy positions ($\omega_{13}$(n), ($\omega_{23}$(n)) of the pseudo-atoms.

As shown in FIG. 14, the inhomogeneous broadening of $\omega_{12}$ is small for all pseudo-atoms. Thus, the pseudo-atoms that interact with the three electromagnetic waves can assume quantum interference in the case where all pseudo-atoms are distributed along the 45° line in the two-dimensional plane. Namely, it is absolutely necessary to select a system in which the inhomogeneous broadening between levels 1 and 2 is small, in order to accomplish RQB in a solid by means of V-type excitation.

As mentioned above, in the case of a rare-earth ion, the transition between two levels has a small inhomogeneous broadening in a hyperfine structure or a super hyperfine structure divided by f electron-nuclear hyper-fine coupling or nuclear quadrupole interaction (not by crystal field or spin-orbit interaction). In the case of a transition metal ion, the transition between two levels has a small inhomogeneous broadening in a hyperfine structure or a super hyperfine structure divided by spin-orbit interaction between d electrons, d electron-nuclear hyper-fine coupling or nuclear quadrupole interaction (not by crystal field). Hence, three levels corresponding to V-type excitation can be set, for the first time, by using a solid material containing rare-earth ions or transition metal ions, the inhomogeneous broadening of which can be determined by examining the interaction of the electrons and nucleus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION (First Embodiment)

Figure 15:
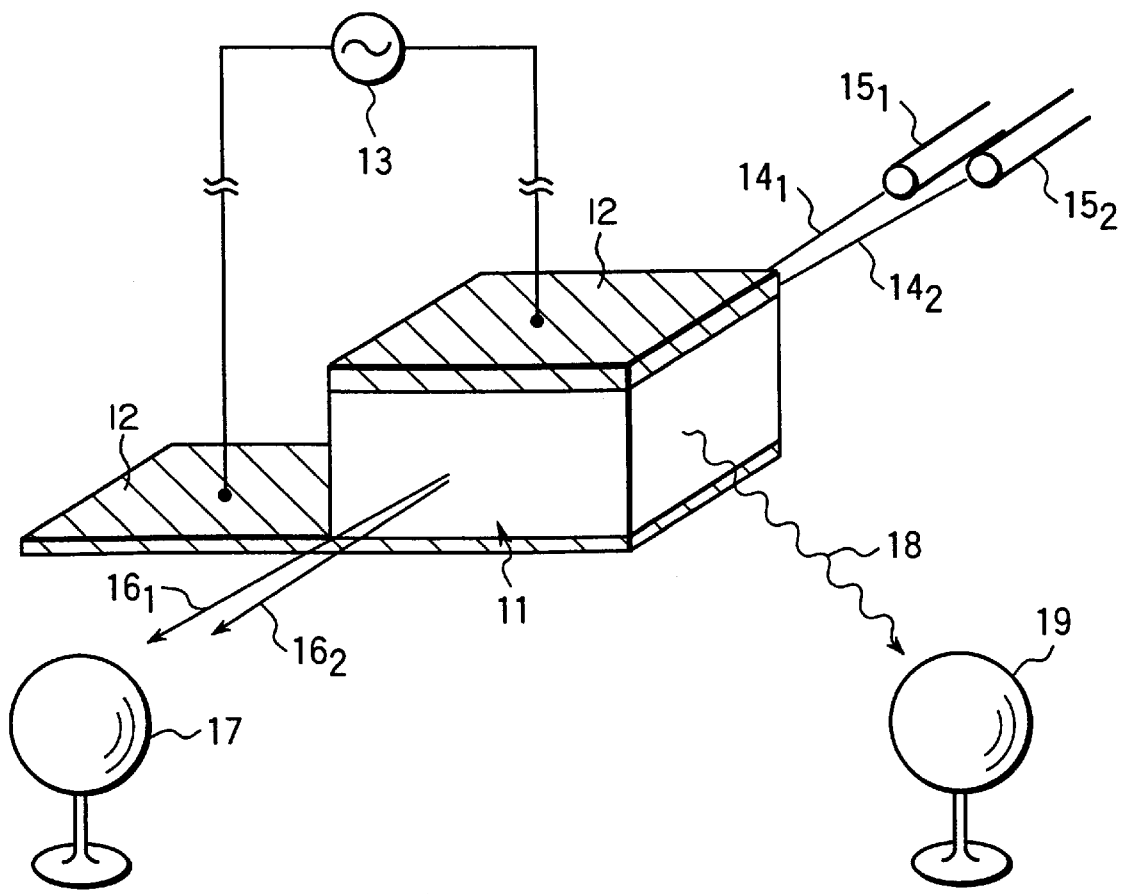
FIG. 15 shows a light-modulating element according to a first embodiment of the present invention.

FIG. 15 shows a light-modulating element according to a first embodiment of the present invention. In the light-modulating element, a high-frequency electric field (an external field) is applied to an RQB medium (a solid in which EIT is to be induced), thereby to perform quantum dynamic control on the intensities of two light beams (signal light beams) transmitting through the RQB medium and the intensity of the light emitted from the RQB medium.

As shown in FIG. 15, the light-modulating element comprises a RQB medium 11, a pair of electrodes 12, a high-frequency power supply 13, a signal light source (not shown), and optical fibers $15_1$ and $15_2$. The RQB medium 11 changes the intensities of the signal light beams while the beams are transmitting through it. The medium 11 also changes the intensity of the light it emits (i.e., emission from level 1 in Λ-type excitation, and emission from levels 1 and 2 in V-type excitation). The electrodes 12 are provided on the opposite sides of the RQB medium 11. The power supply 13 applies an external field (i.e., a high-frequency electric field) through the electrodes 12 to the RQB medium 11, thereby exciting the medium 11. The optical fibers $15_1$ and $15_2$ guide signal light beams $14_1$ and $14_2$, respectively, from the signal light source to the RQB medium 12.

Also shown in FIG. 15 are photodiodes 17 and 19. The photodiode 17 is provided to measure the intensities of the signal light beams $14_1$ and $14_2$. The photodiode 19 is provided to measure the light beam 18 emitted from the RQB medium 11.

The electrodes 12 may be replaced by a pair of electromagnets or by a cavity resonator. In either case, the external field is a high-frequency electromagnetic field, and power supplier is a high-frequency power supplier.

In the case a cavity resonator is used in place of the electrodes 12, it should have such a shape as would apply practically only a high-frequency electromagnetic field to the RQB medium 11.

The signal light source may have two lasers for emitting laser beams, which are the signal light beams $14_1$ and $14_2$. If the frequencies differ by 1 GHz or less, the signal light source can be a single laser. If so, the light beam emitted from the laser is amplitude-modulated by an acousto-optic or acousto-optic modulator element (hereinafter referred to as "AO element"), thus generating two light beams, and the two light beams thus generated are used as signal light beams $14_1$ and $14_2$.

The use of the AO element is advantageous in that the two light beams it generates completely overlap and need not be aligned with each other in the RQB medium 11. Namely, the light beam emitted from the laser is applied to the AO element. The optical paths of the two light beams output from the AO element are adjusted in position, so that these light beams (diffracted beams) may be applied to the RQB medium 11 through the optical fibers $15_1$ and $15_2$, respectively.

Assume two light beams polarized in the same direction propagate in the same axis and the same direction, and that these light beams have the same photoelectric-field intensity EL and frequencies of $\omega_L+(\frac{1}{2})\delta\omega$ and $\omega_L-(\frac{1}{2})\delta\omega$, respectively. The total electric field ETOT for the two light beams is given as follows:

$$E_{TOT}=E_L \cos (\omega_L-(\frac{1}{2})\delta\omega)t+E_L \cos [\omega_L+(\frac{1}{2})\delta\omega]t \quad (13)$$

The two light beams have intensities, which are proportional to the square of the total electric field, as can be understood from the following equation:

$$I_{TOT}=4\alpha E_L^2\{\cos (\omega_L t)\}^2 \cdot \{\cos ((\frac{1}{2})\delta\omega t)\}^2 =4\alpha E_L^2\{\cos (\omega_L t)\}^2 \cdot \{(1+\cos (\delta\omega t))/2\} \quad (14)$$

It should be noted that $\alpha=(\epsilon/\mu)^{\frac{1}{2}}$, where $\epsilon$ is dielectric constant and $\mu$ is magnetic permeability.

As is clear from its second term, the equation (14) representing the intensities of two light beams is identical to an equation of the intensity of one light beam which has frequency WL and whose amplitude has been modulated 100% by frequency $\delta\omega$.

In the light-modulating element shown in FIG. 15, the output of the AO element is amplitude-modulated. Two light beams propagating in the same axis and the same direction are thereby generated from one light beam. Further, a high-speed power amplifier amplifies the output (high-frequency voltage) of the high-frequency power supply 13, and the high-frequency voltage thus amplified is applied to the pair of electrodes 12.

The light-modulating element according to the first embodiment will be described in more detail.

A light-modulating element according to the first embodiment was made for testing. The RQB medium 11 used in this element is made of $YalO_3$ containing, as impurities, 0.05% of $Pr^{3+}$ ions. The signal light source is a CW dye laser.

Figure 16:
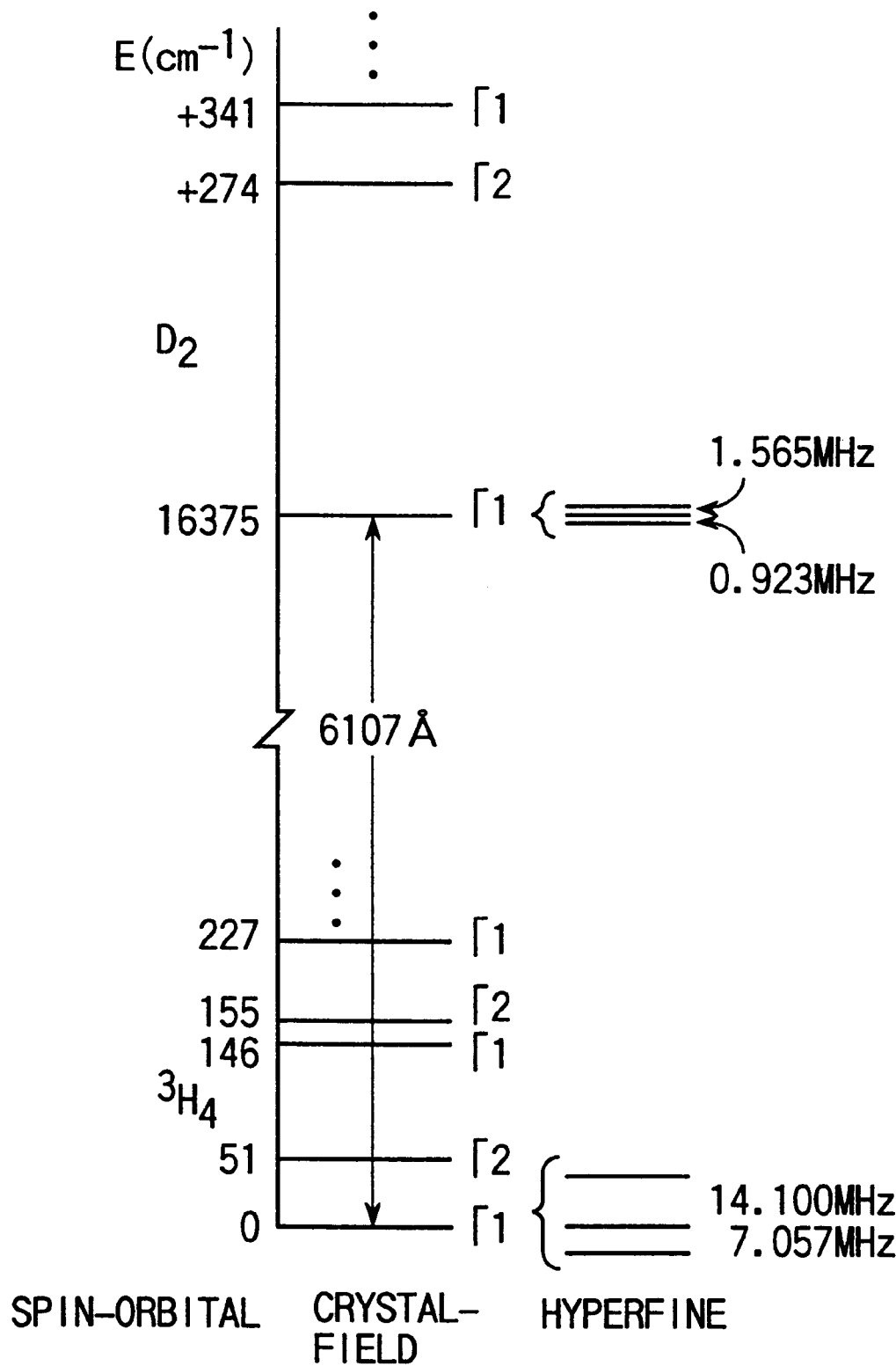
FIG. 16 is a diagram showing various energy levels a $Pr^{3+}$ ion may take in the RQB medium incorporated in the light-modulating element.

FIG. 16 shows the energy levels the $Pr^{3+}$ ions may take in the light-modulating element. Ground state $^3H_4(0)$ and excited state $^1D_2(0)$ are singlets if viewed as electrons. When nuclear spin is taken into account, each state is split into three sub-levels (hyperfine structures) by virtue of quadrupole interaction. Nine transitions $^3H_4(0) \leftarrow \rightarrow ^1D_2(0)$ in all may take place. These transitions are all electric dipole transitions.

The transitions between the hyperfine structures in the ground state $^3H_4(0)$ and excited state $^1D_2(0)$ are all electric dipole transitions. The inhomogeneous broadening of the transition $^3H_4(0)(\leftarrow \rightarrow ^1D_2(0)$ is narrow, ranging from several kHz to several tens of kHz.

In the test of the light-modulating element, the frequency difference $\delta\omega$ between the two signal light beams $14_1$ and $14_2$ was adjusted to the frequency difference (0.92 MHz)

between the hyperfine structures in the excited state $^1D_2(0)$, by means of amplitude modulation performed by the AO element. A high-frequency electric field having frequency of 0.92 MHz was applied as the external field, further exciting the hyperfine structures in the excited state $^1D_2(0)$. In the light-modulating element, the tree levels of $Pr^{3+}$ ions were excited by means of V-type excitation, in order to modulate the signal light beams $14_1$ and $14_2$. The signal light beams $14_1$ and $14_2$ had intensity of about 1 mW when applied to the RQB medium 11, and the external field (electric field) applied had intensity of about $2\times10^2$ V/cm.

Figure 17:
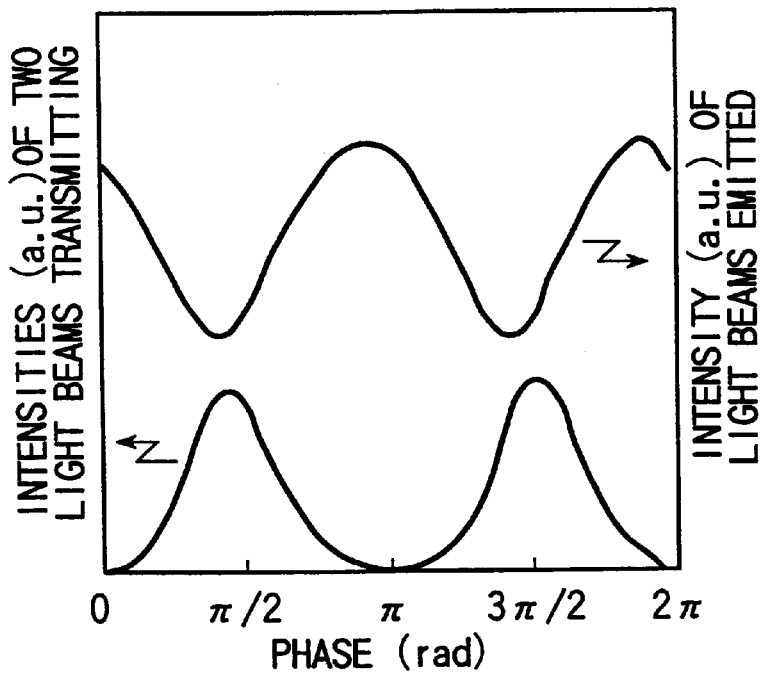
FIG. 17 is a graph illustrating how the amount of light the light-modulating element absorbs and emits depends on the phase of the external field.

The intensities of the signal light beams $14_1$ and $14_2$ transmitting through the RQB medium 11 and the intensity of the light emitted from the hyperfine structures in the state $^1D_2(0)$ were monitored, while changing the phases between the beats of the beams $14_1$ and $14_2$, and the external field. FIG. 17 shows how the intensities the light beams transmitting through the medium 11 and the intensity emitted from the hyperfine structure in the exited state depended on the phase of the external field. The phases plotted on the abscissa in FIG. 17 are of relative values which are slightly different from the actual values.

Figure 1:
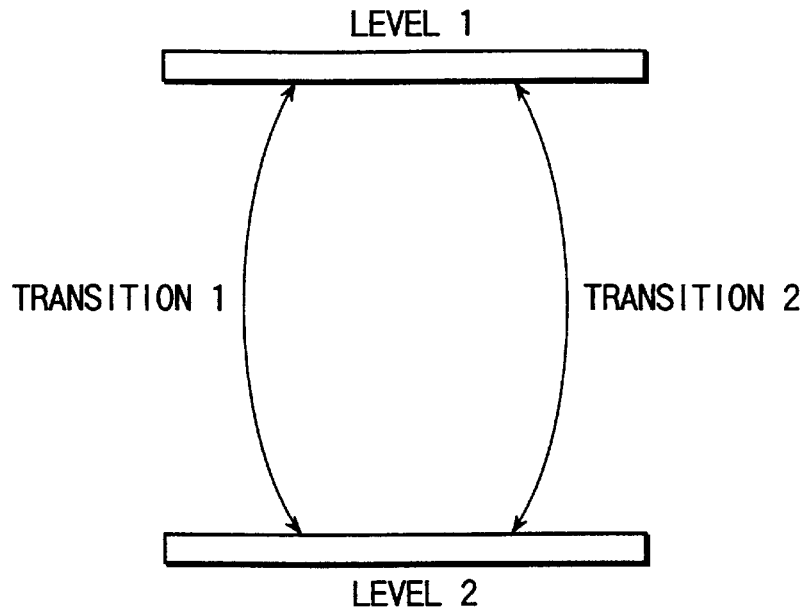
FIG. 1 is a diagram explaining the concept of a quantum interference effect.
Figure 2A:
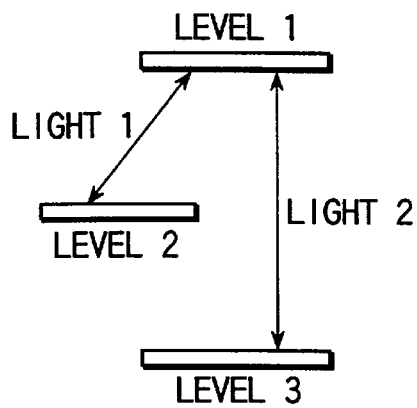
FIGS. 2A to 2C are qualitative energy diagrams, each showing the relation between three energy levels and two coherent light beams, so as to explain the concept of EIT.
Figure 2B:
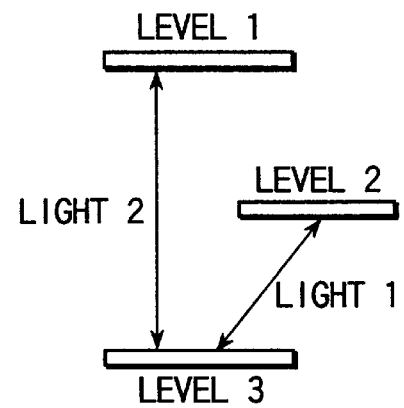
Figure 2C:
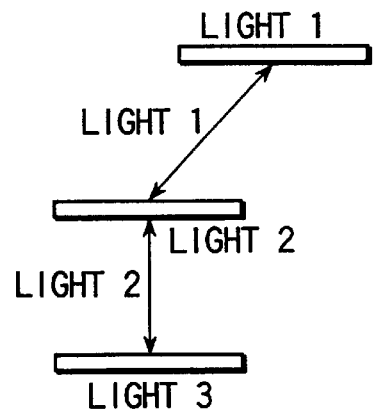
Figure 3A:
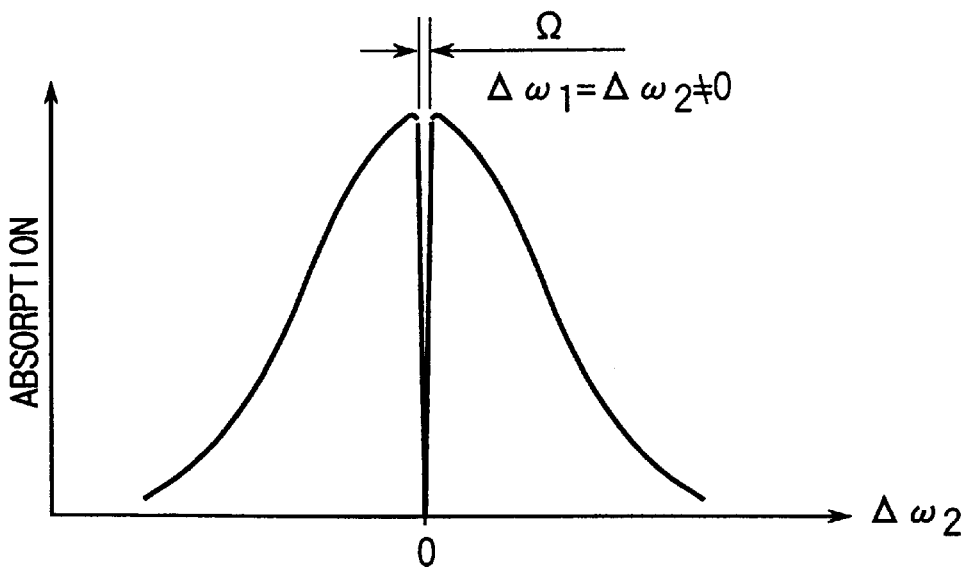
FIGS. 3A and 3B are qualitative absorption spectra obtained when atom gas is subjected to Λ-type excitation to induce EIT, by changing the frequency of the light beam 2 and maintaining the frequency of the light beam 1 at a fixed value.
Figure 3B:
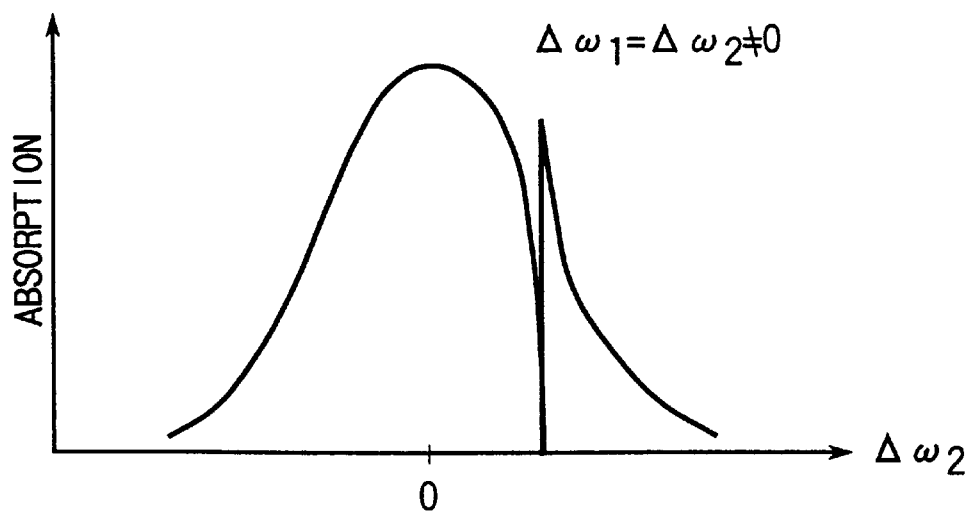
Figure 4:
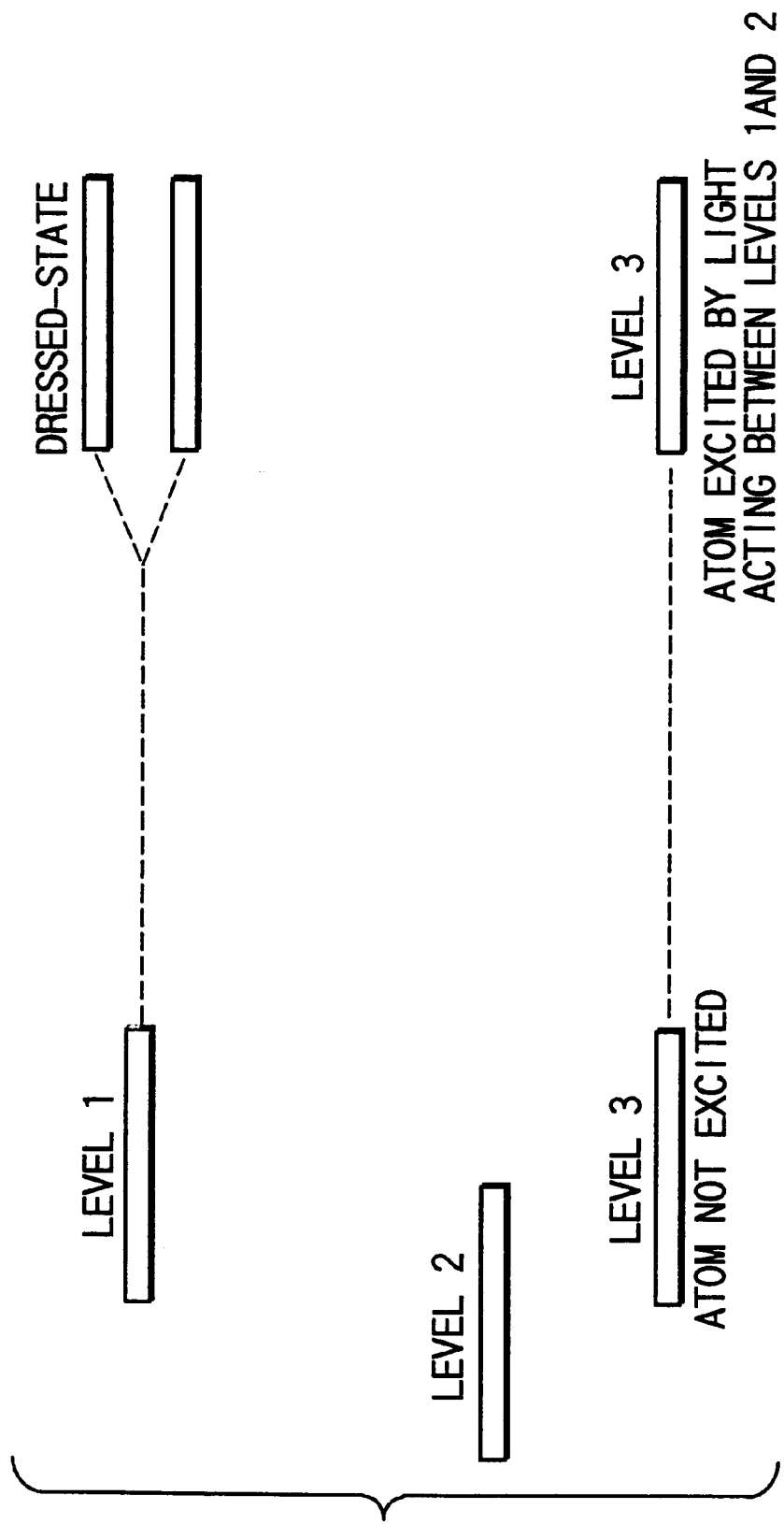
FIG. 4 is a diagram explaining how EIT is induced.
Figure 5:
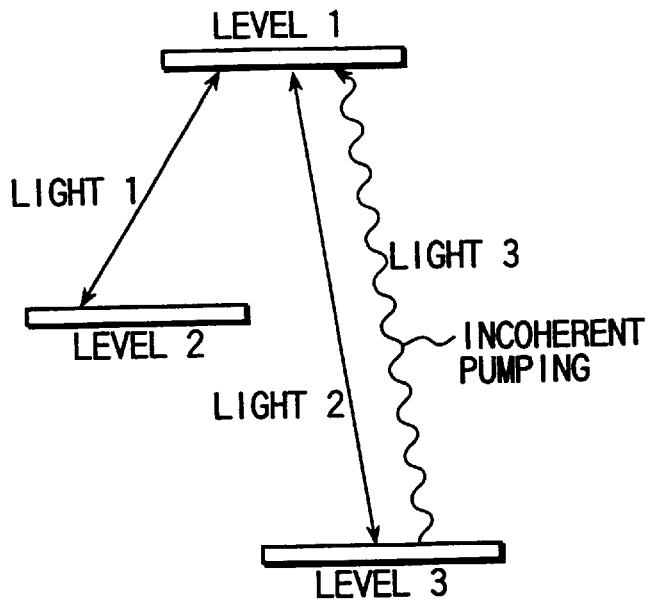
FIG. 5 is a qualitative energy diagram showing the relation between energy levels in atom gas and coherent light beams, and explaining the concept of LWI resulting from EIT.
Figure 6A:
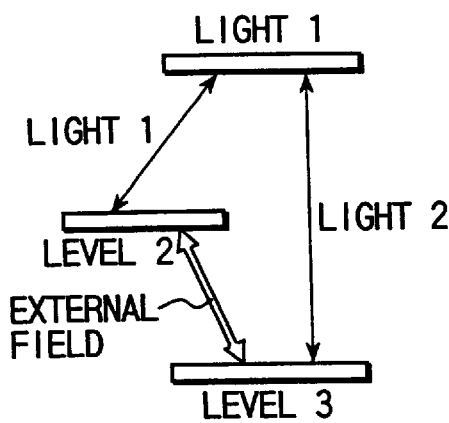
FIGS. 6A to 6C are qualitative energy diagrams, each showing the relation between three energy levels and a coherent external field, so as to explain the concept of RQB applied to the present invention.
Figure 6B:
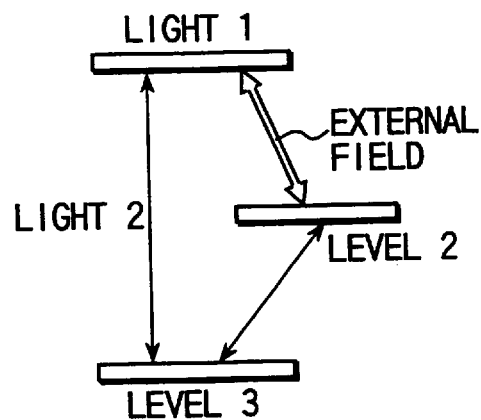
Figure 6C:
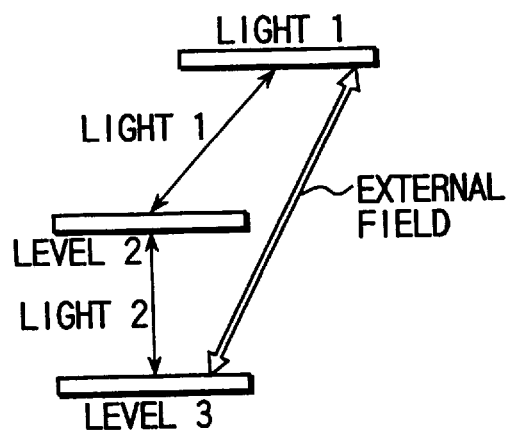
Figure 7A:
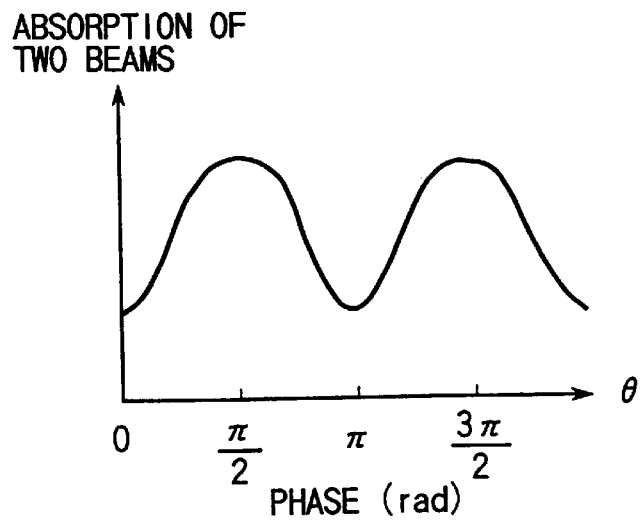
FIG. 7A is a graph showing how the amount of light absorbed depends on the phase of the external field when the relaxation rate is greater than the Rabi frequency of an external field, thereby representing the optical characteristics of RQB.
Figure 7B:
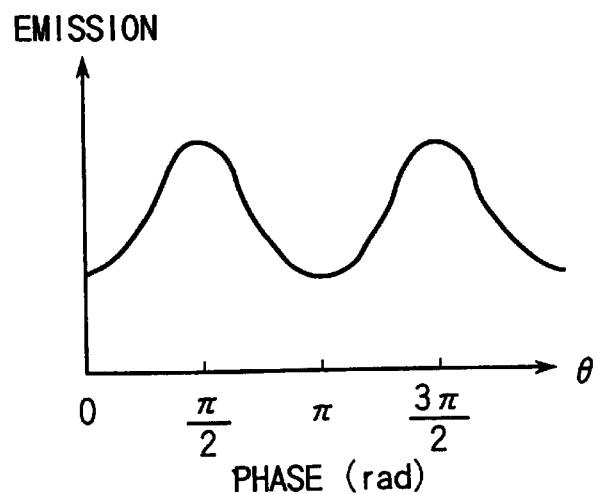
FIG. 7B is a graph showing how the amount of light emitted depends on the phase of the external field when the relaxation rate is greater than the Rabi frequency of an external field, thereby representing the optical characteristics of RQB.
Figures 8A, 8B:
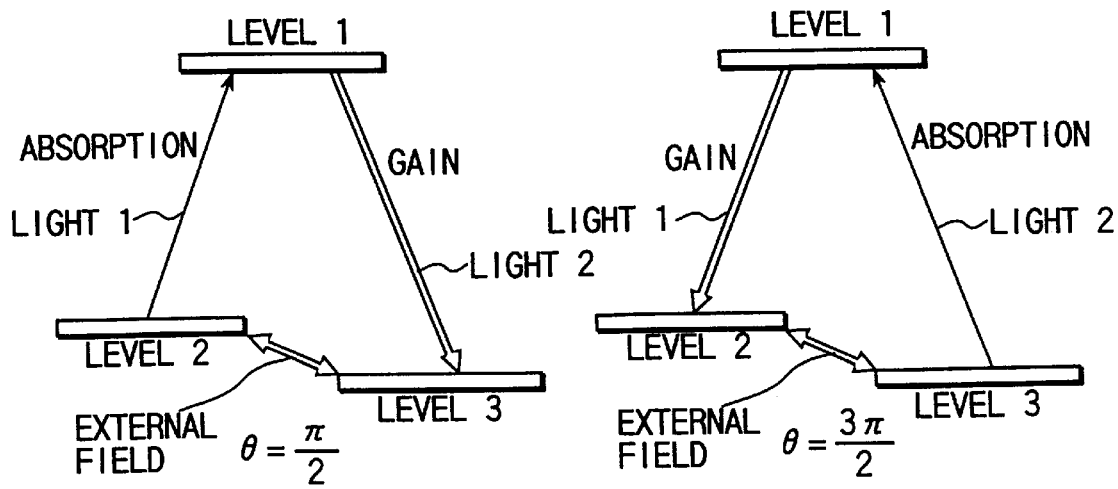
FIGS. 8A and 8B are energy diagrams for explaining the optical characteristics of RQB, particularly a gain obtained without inverting the distribution of electrons when the relaxation rate is greater than the Rabi frequency of an external field.
Figure 9:
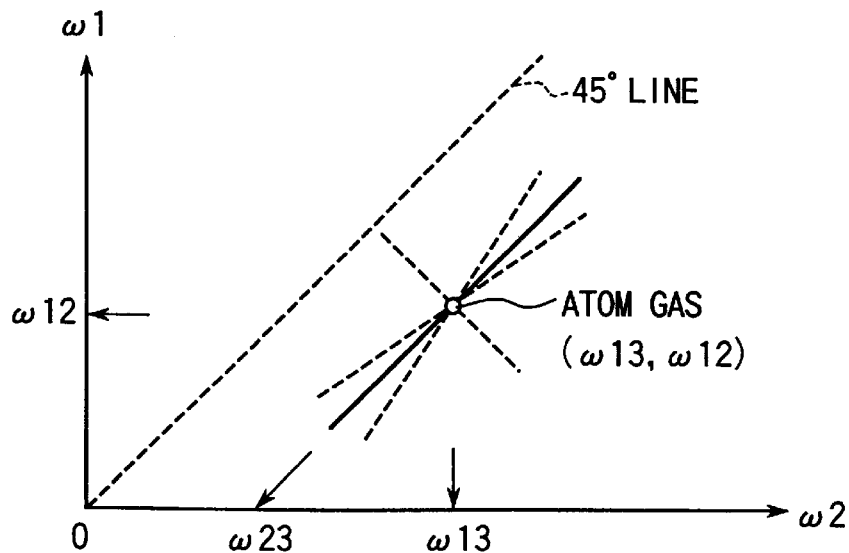
FIG. 9 depicts a ($\omega_2$, $\omega_1$)-plane, explaining RQB, or more precisely the detuning condition for obtaining a quantum interference effect in atom gas which has been subjected to Λ-type excitation.
Figure 10:
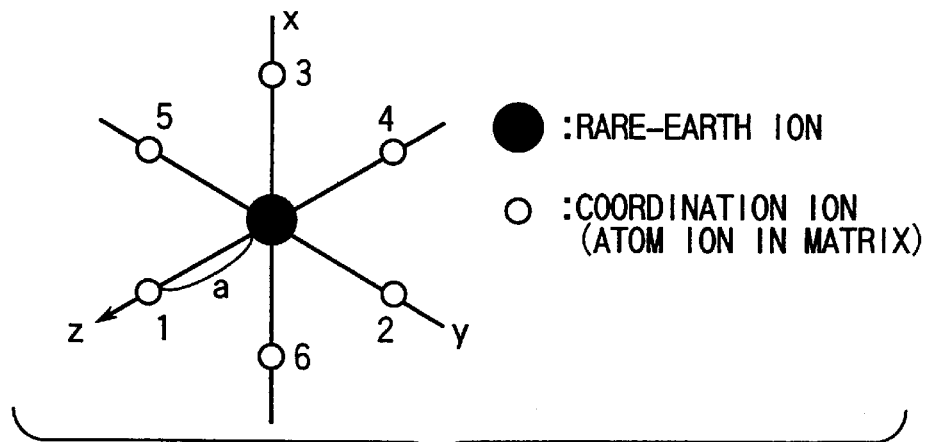
FIG. 10 shows a crystal field acting on a rare-earth ion which has one f electron.
Figure 11:
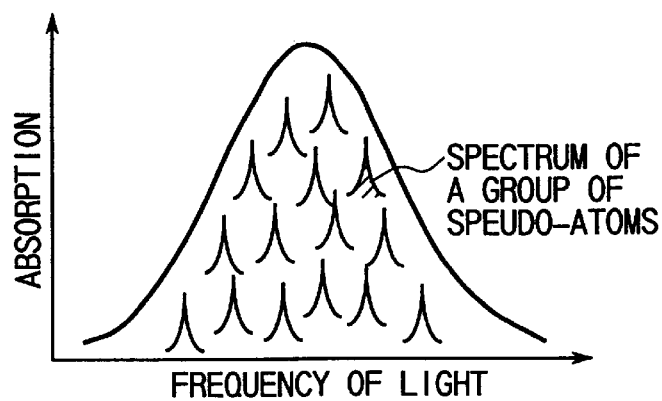
FIG. 11 shows a qualitative spectrum, for explaining the inhomogeneous broadening of a transition.
Figure 12A:
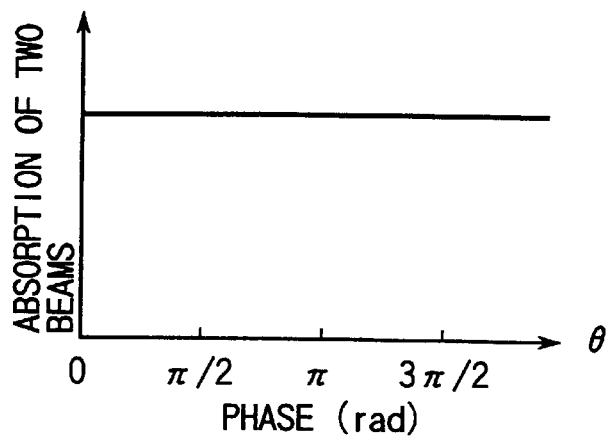
FIG. 12A is a graph illustrating how the amount of light absorbed depends on the phase of the external field when the relaxation rate is greater than the Rabi frequency of an external field, thereby explaining that RQB cannot be observed in a three-level system in which all three transitions have inhomogeneous broadening.
Figure 12B:
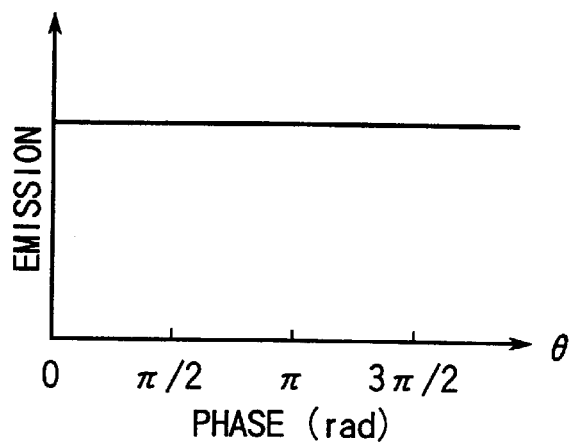
FIG. 12B is a graph illustrating how the amount of light emitted depends on the phase of the external field when the relaxation rate is greater than the Rabi frequency of an external field, thereby explaining that RQB cannot be observed in a three-level system in which all three transitions have inhomogeneous broadening.
Figure 13:
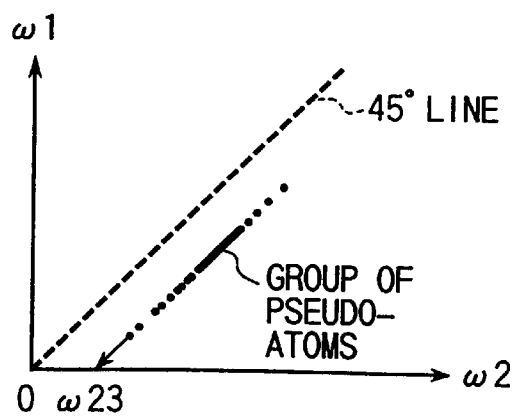
FIG. 13 shows a ($\omega_2$, $\omega_1$)-plane, explaining RQB, or more precisely the detuning condition for many pseudo-atoms induce a quantum interference effect when subjected to Λ-type excitation.
Figure 14:
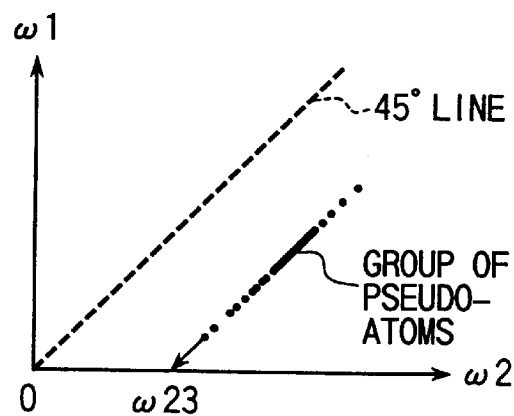
FIG. 14 shows a ($\omega_2$, $\omega_1$)-plane, explaining RQB, or more precisely the detuning condition for many pseudo-atoms induce a quantum interference effect when subjected to V-type excitation.

As seen from FIG. 17, the intensities of the beams transmitting through the medium 11 and the intensity of the light emitted from the medium 11 greatly depended on the phase of the external field and cyclically changed with cycle $\pi$. Comparison of FIG. 17 with FIGS. 7A and 7B reveals that the transmission and emission changed very similarly with the phase of the external field. From this it is understood that a quantum interference effect was induced in the light-modulating element shown in FIG. 15.

(Comparative Example 1)

A comparative light-modulating element was made, which is different from the element of FIG. 15 in the following respects. First, the highest level 1 was one level selected from those of hyperfine structures in state $^3P_0(0)$, not in the exited state $^1D_2(0)$. Second, the external field applied was an infrared laser beam corresponding to transition $^1D_2(0)\leftarrow\rightarrow^3P_0(0)$, not a high-frequency electric field. Third, the two light beams applied were an orange laser beam and a blue laser beam corresponding to the transitions $^3H_4(0)\leftarrow\rightarrow^1D_2(0)$ and $^3H_4(0)\leftarrow\rightarrow^3P_0(0)$, respectively. The light-modulating characteristics the comparative element exhibited in V-type excitation were measured in the same way as in the first embodiment (FIG. 15).

The blue laser beam was generated by combining the frequencies of an orange beam and an infrared ray, which had been generated by a nonlinear crystal. Therefore, the infrared laser beam, i.e., the external field, was therefore perfectly identical in frequency to the beats the blue laser beam and orange laser beam. Further, the phase of the external field was varied by changing the length of the optical path for the infrared ray.

Figure 18:
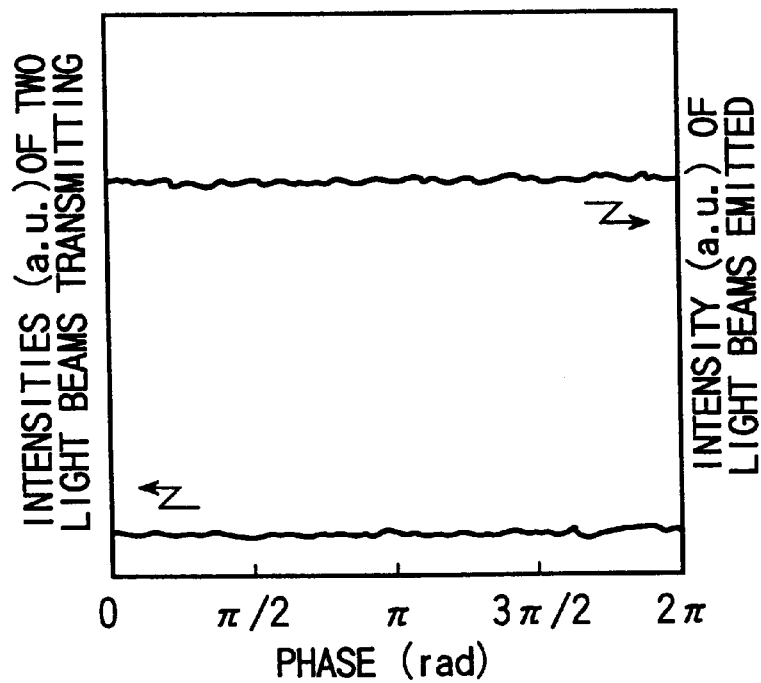
FIG. 18 is a graph showing how the amount of light a comparative light-modulating element absorbs and emits depends on the phase of the external field.

FIG. 18 shows how the intensities the two signal light beams transmitting through the medium and the intensity emitted from the hyperfine structures in the states $^1D_2(0)$ and $^3P_0(0)$ depended on the phase of the external field. As can be seen from FIG. 18, the intensities of the beams transmitting through the medium and the intensity of the light emitted from the medium are constant, not depending upon the phase of the external field.

The three transitions all had an inhomogeneous broadening of about 5 GHz. This means that the three levels all differ from the values desirable for achieving RQB in the three-level system. Hence, it is necessary to determine the inhomogeneous broadenings of the three transitions and then select desirable three levels, in order to accomplish RQB in a solid.

(Second Embodiment)

The light-modulating element according to the second embodiment is identical in structure to the first embodiment (FIG. 15), except that the RQB medium 11 is made of $Al_2O_3$ containing, as impurities, 0.05% of $Cr^{3+}$ ions and that CW titanium-sapphire lasers are used as signal light sources.

Figure 19:
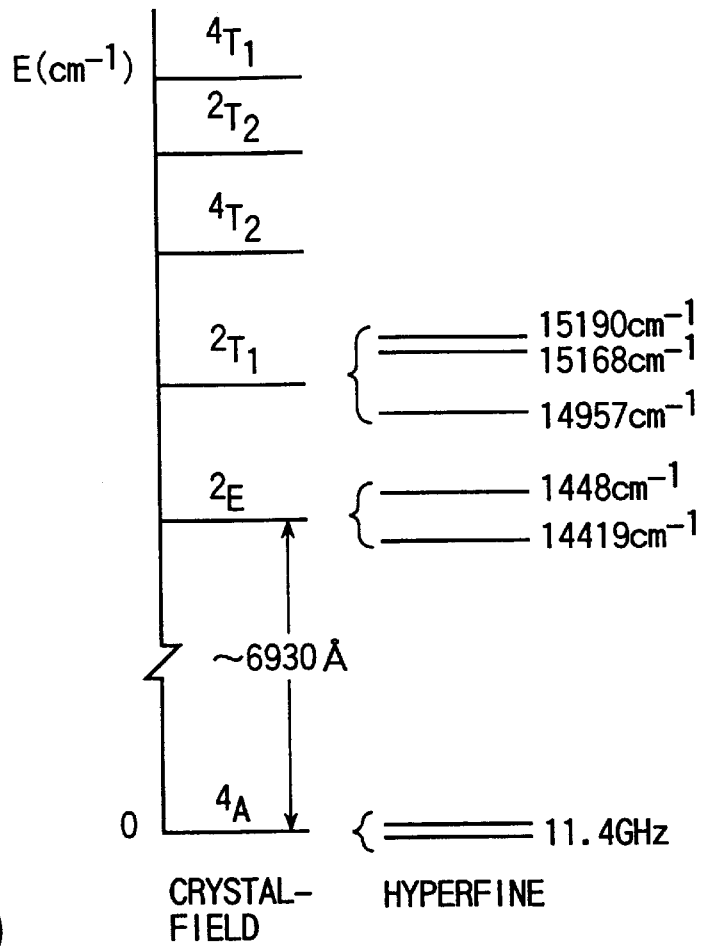
FIG. 19 is a diagram showing various energy levels a $Cr^{3+}$ ion may take in the RQB medium incorporated in a light-modulating element according to a second embodiment of the invention.

FIG. 19 shows the energy levels the $Cr^{3+}$ ions may take in the light-modulating element. In a crystal field of cubic symmetry, ground state $^4A$ and excited state $^2E$ are degenerated, each from four levels to one level. In the second embodiment, each of these states is split into two sub-levels (or two hyperfine structures) by virtue of spin-orbit interaction.

Since the transition $^4H\leftarrow\rightarrow^2E$ is accompanied by spin flip, the oscillator strength is small. Nonetheless, excitation can be effected by applying light. Magnetic dipole transition can occur between hyperfine structures. The transition $^4A\leftarrow\rightarrow^2E$ has a broad inhomogeneous broadening of about 4 GHz. By contrast, the transition between the hyperfine structures has a narrow inhomogeneous broadening of about several MHz.

A light-modulating element according to the second embodiment was made for testing.

In the test, the frequency difference 68 of the two signal light beams $14_1$ and $14_2$ was adjusted to the frequency difference (11.4 GHz) between the hyperfine structures in the ground state $^4A$. More specifically, the beats of the signal light beams $14_1$ and $14_2$ were measured at positions away from the RQB medium 11, and the beats measured were fed back to the control system for the lasers, thereby maintaining the frequency difference $\delta\omega$ at 11.4 GHz. A high-frequency magnetic field having frequency of 11.4 GHz was applied as the external field, exciting the hyperfine structures in the state $^4A$. In the light-modulating element, the tree levels of $Cr^{+3}$ ions were excited by means of $\Lambda$-type excitation, in order to modulate the signal light beams $14_1$ and $14_2$.

As described above, the first embodiment has a pair of electrodes 12 provided on the opposing sides of the RQB medium 11. The second embodiment differs from the first embodiment in that the RQB medium 11 is arranged in a cavity resonator. The cavity resonator applies an intense high-frequency electromagnetic field to the RQB medium 11. The magnetic field has an intensity of approximately 20 $MW/cm^2$. The cavity resonator has tiny holes in both sides, which allow passage of the signal light beams $14_1$ and $14_2$. The signal light beams $14_1$ and $14_2$ had intensity of about 6 mW when applied to the RQB medium 11.

Figure 21:
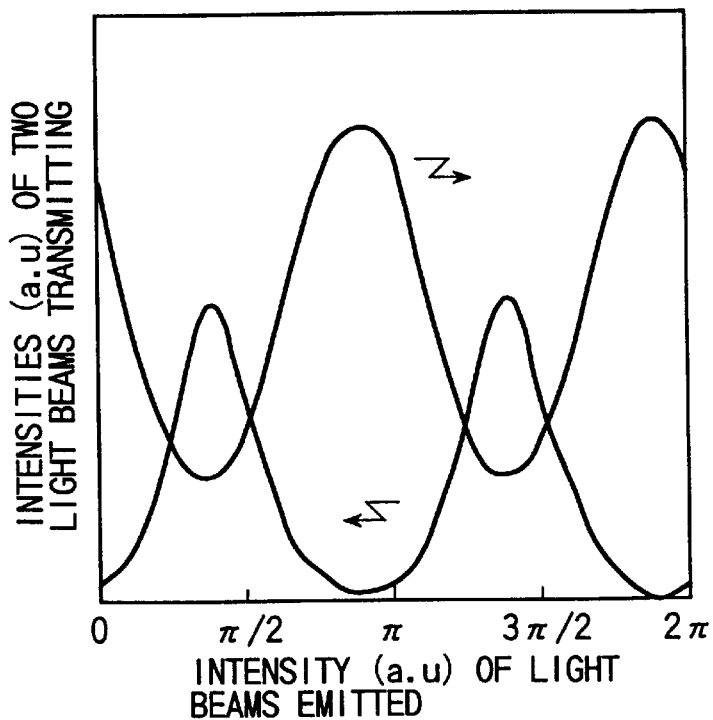
FIG. 21 is a graph illustrating how the amount of Li light the second embodiment absorbs and emits depends upon the phase of the external field.

The intensities of the signal light beams $14_1$ and $14_2$ transmitting through the RQB medium 11 and the intensity of the light emitted from the hyperfine structures in the state $^2E$ were monitored, while changing the phases between the beat of the beams $14_1$ and $14_2$, and the external field. FIG. 21 shows how the intensities the light beams transmitting through the medium 11 and the intensity emitted from the hyperfine structure in the state $^2E$ depended upon the phase of the external field.

As is evident from FIG. 21, the intensities of the beams transmitting through the medium 11 and the intensity of the light emitted from the medium 11 oscillated with cycle $\pi$, depending on the phase of the external field. Comparison of FIG. 17 with FIGS. 7A, 7B and 17 reveals that the absorption and emission changed very similarly with the phase of the external field. This demonstrates that a quantum interference effect was induced in the light-modulating element of the second embodiment, too.

It was also determined, by another method, that a quantum interference effect was induced in the light-modulating element. This test was done in the light-modulating element of the first embodiment. Namely, the intensity of light emitted from the hyperfine structure in the states $^1D_2(0)$ was monitored, while changing the frequency difference $\delta\omega$ of the signal light beams $14_1$ and $14_2$. The results of the monitoring were as is shown in FIGS. 20A and 20B.

Figure 20A:
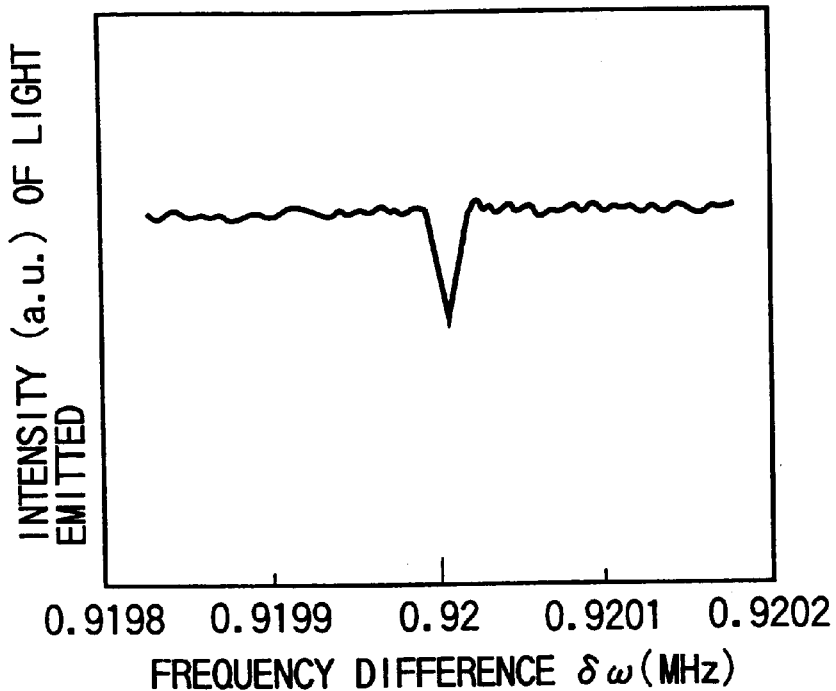
FIGS. 20A and 20B are graphs representing the δω-dependency of the emission achieved by the second embodiment.

As shown in FIG. 20A, the intensity of the light emitted increases if the frequency difference $\delta\omega$ deviates from the resonance frequency, while the phase of the external field remains at a value (about $0.4\pi$ in this case) that would reduce the intensity to a minimum. Namely, if the frequency difference $\delta\omega$ is equal to the resonance frequency, absorption is inhibited in the light-modulating element. Thus, if the phase of the external field is $0.4\pi+n\pi$, a quantum interference effect will occur in which the energy transitions weaken one another.

Figure 20B:
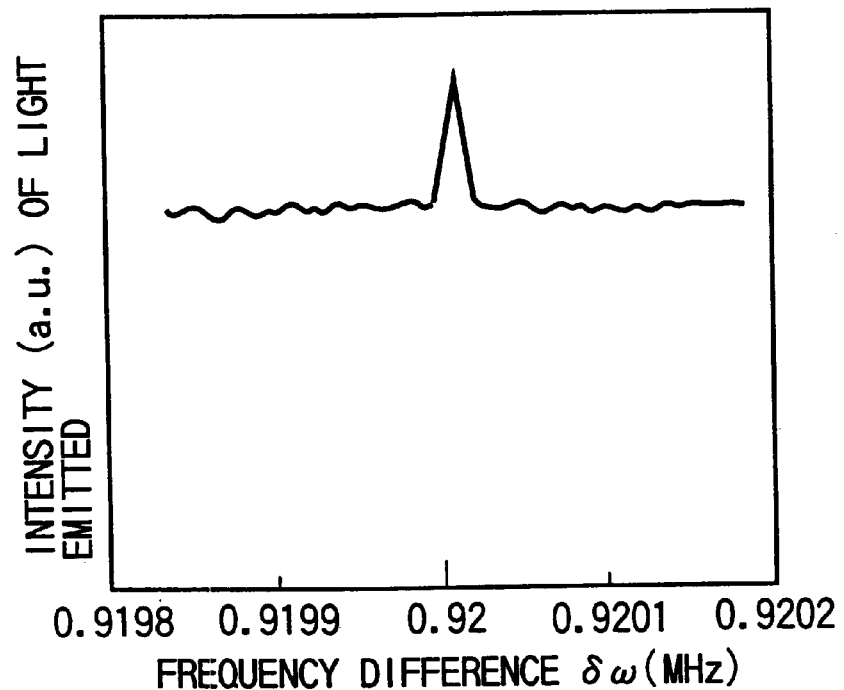

Conversely, as shown in FIG. 20B, the intensity of the light emitted decreases, becoming equal to the value shown in FIG. 20A, if the frequency difference $\delta\omega$ deviates from the resonance frequency, while the phase of the external field remains at a value (about $0.9\pi$ in this case) that would reduce the intensity to a maximum. Namely, if the frequency difference $\delta\omega$ is equal to the resonance frequency, absorption is enhanced in the light-modulating element. Thus, if the phase of the external field is $0.9\pi+n\pi$, a quantum interference effect will occur in which the energy transitions are strengthen.

(Third Embodiment)

The light-modulating element according to the third embodiment is identical in structure to the first embodiment (FIG. 15), except that the RQB medium 11 is made of $Y_2SiO_5$ containing, as impurities, 0.02% of $Pr^{3+}$ ions and that one CW dye laser is used as signal light source.

Figure 22:
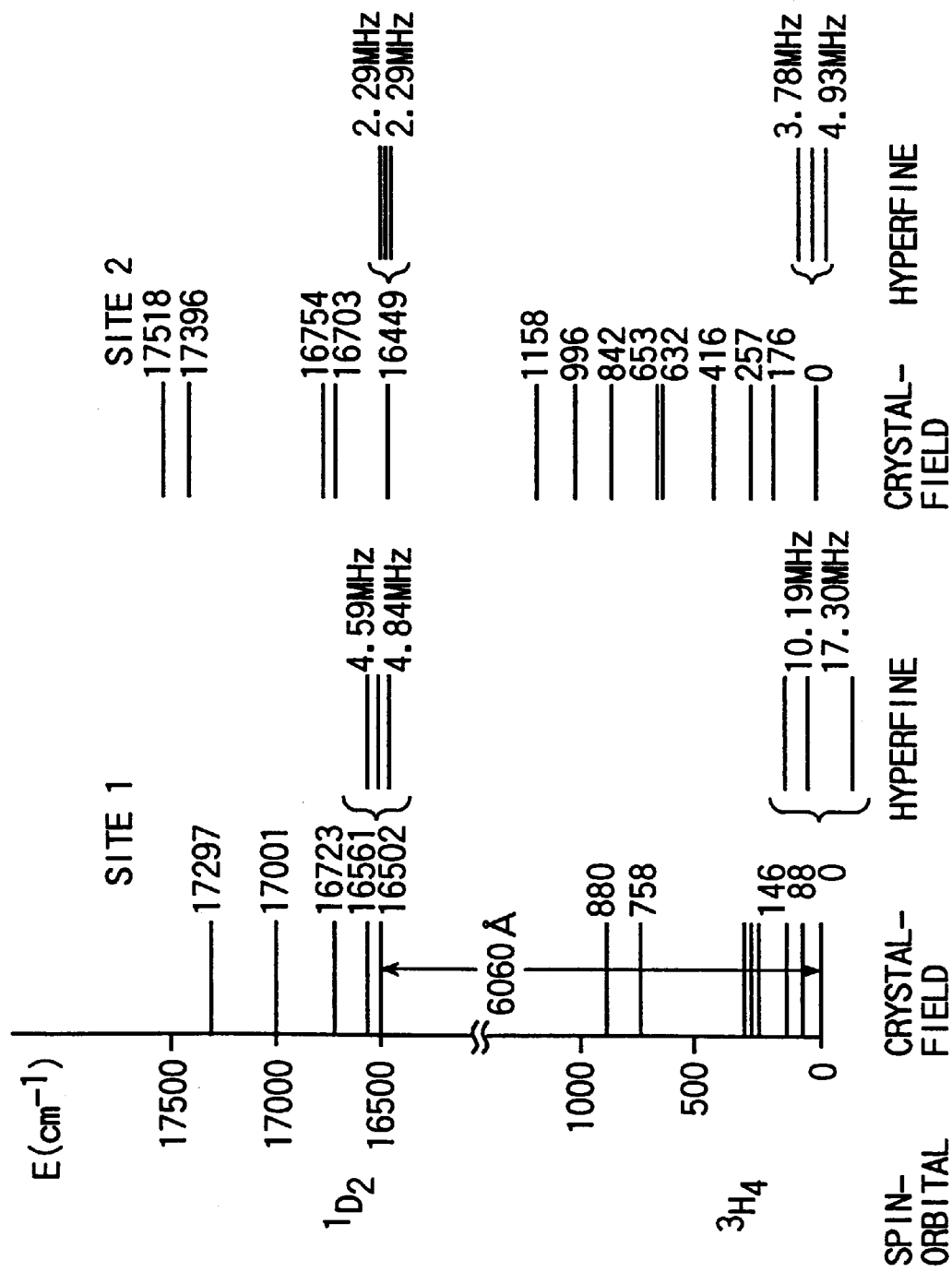
FIG. 22 is a diagram showing various energy levels a $Pr^{3+}$ ion may take in the RQB medium incorporated in a light-modulating element according to a third embodiment of the present invention.

FIG. 22 shows the energy levels the $Pr^{3+}$ ions may take in this light-modulating element. The $Pr^{3+}$ ions have two sites in $Y_2SiO_5$. At either site, the ground state $^3H_4(0)$ and the excited state $^1D_2(0)$ are split, each into three sub-levels, by virtue of quadrupole interference.

Nine transitions $^3H_4(0) \leftarrow\rightarrow ^1D_2(0)$ take place at each site. These transitions are all electric dipole transitions. The transitions between the hyperfine structures in the state $^3H_4(0)$ and the transitions between the hyperfine structures in the state $^1D_2(0)$ are also electric dipole transitions. The inhomogeneous broadening of the transitions $^3H_4(0) \leftarrow\rightarrow ^1D_2(0)$ is about 4 GHz at site 1, and about 3 GH at site 2. By contrast, the inhomogeneous broadening between the hyperfine structures is much narrower, about tens of KHz.

A light-modulating element according to the third embodiment was made for testing.

In the test of the light-modulating element, the frequency difference $\delta\omega$ between the two signal light beams $14_1$ and $14_2$ was adjusted to the frequency difference (17.3 MHz) between the hyperfine structures in the ground state $^3H_4(0)$ at site 1, by means of amplitude modulation performed by the AO element. A high-frequency electric field having frequency of 17.3 MHz was applied as the external field, exciting the hyperfine structures in the state $^3H_4(0)$. In the light-modulating element, the tree levels of $Pr^{3+}$ ions were excited by means of $\Lambda$-type excitation, in order to modulate the signal light beams $14_1$ and $14_2$. The signal light beams $14_1$ and $14_2$ had intensity of about 0.5 mW when applied to the RQB medium 11, and the external field (i.e., electric field) applied had intensity of about $7 \times 10^2$ V/cm.

Figure 23:
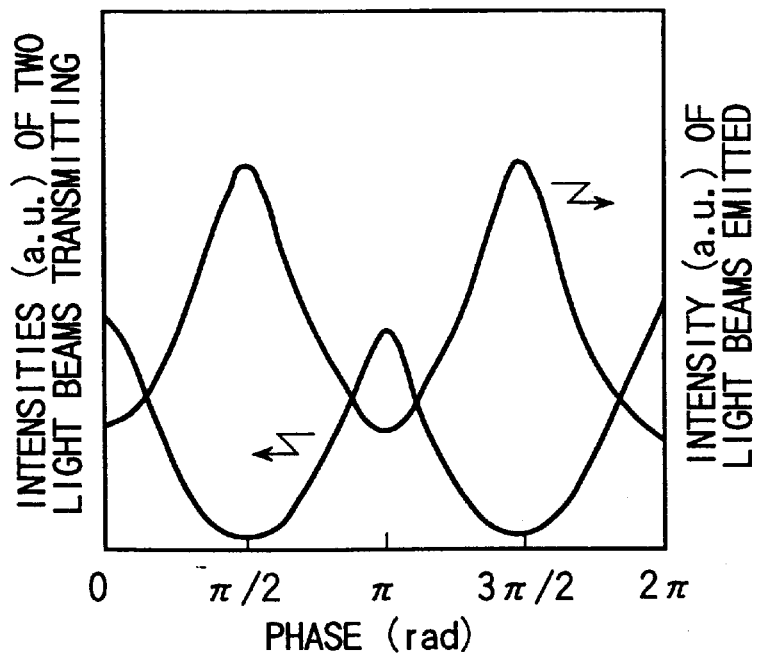
FIG. 23 is a graph showing how the amount of light the third embodiment absorbs and emits depends upon the phase of the external field.

The intensities of the signal light beams $14_1$ and $14_2$ transmitting through the RQB medium 11 and the intensity of the light emitted from the hyperfine structures in the state $^1D_2(0)$ were monitored, while changing the phases of the beats of the beams $14_1$ and $14_2$ with respect to the phase of the external field. FIG. 23 shows how the intensities the light beams transmitting through the medium 11 and the intensity emitted from the hyperfine structure in the state $^1D_2(0)$ depended on the phase of the external field.

As seen from FIG. 23, the intensities of the beams transmitting through the medium 11 and the intensity of the light emitted from the medium 11 cyclically changed with cycle $\pi$, depending on the phase of the external field. From this it is understood that a quantum interference effect was induced in the light-modulating element according to the third embodiment, too.

(Fourth Embodiment)

The light-modulating element according to the fourth embodiment is identical in structure to the first embodiment (FIG. 15), except that the RQB medium 11 is made of $YliF_4$ containing, as impurities, 0.01% of $Tb^{3+}$ ions and that one CW dye laser is used as signal light source.

Figure 24:
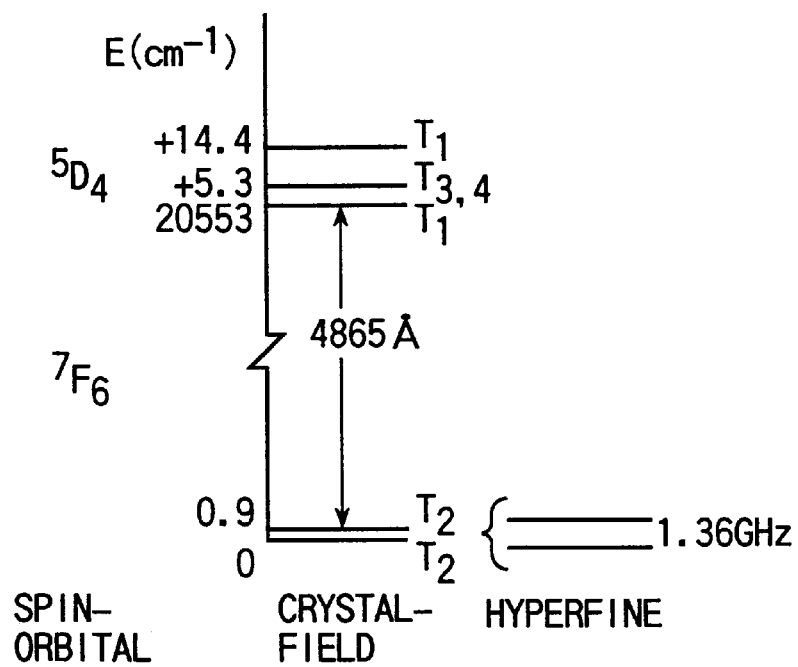
FIG. 24 is a diagram showing various energy levels a $Pr^{3+}$ ion may take in the RQB medium incorporated in a light-modulating element according to a fourth embodiment of this invention.

FIG. 24 shows the energy levels the $Tb^{3+}$ ions may take in this light-modulating element. Ground state $^7F_6(0)$ and excited state $^5D_4(0)$ are singlets if viewed as electrons. When nuclear spin is taken into account, each state is split into two sub-levels by virtue of quadrupole interaction. Five transitions $^7F_6(0) \leftarrow\rightarrow ^5D_4(0)$ in all may take place. These transitions are all electric dipole transitions. The transitions between the hyperfine structures in the state $^7F_6(0)$ and the transitions between the hyperfine structures in the state $^5D_4(0)$ are also electric dipole transitions. The inhomogeneous broadening of the transitions $^7F_6(0) \leftarrow\rightarrow ^5D_4(0)$ is about 0.8 GHz and relatively large. By contrast, the inhomogeneous broadening between the hyperfine structures is much narrower, about hundreds of Hz to several KHz.

A light-modulating element according to the third embodiment was made for testing.

In the test of the light-modulating element, a high-frequency electromagnetic field having a frequency of 1.36 HGz was applied as an external field, exciting the hyperfine structures in the state $^7F_6(0)$. The beam emitted from the laser was split into two beams by a beam splitter. The two beams were supplied by frequency-modulating the outputs from the beamsplitter with two AO elements. AO elements shifted the frequencies of these beams, whereby the frequency difference $\delta\omega$ between the beams was adjusted to the frequency difference between the hyperfine structures in the state $^7F_6(0)$. The two beams obtained in this way were used as signal light beams $14_1$ and $14_2$.

In the light-modulating element, the tree levels of $Tb^{3+}$ ions were excited by means of $\Lambda$-type excitation, in order to modulate the signal light beams $14_1$ and $14_2$.

As described above, the first embodiment has a pair of electrodes 12 provided on the opposing sides of the RQB medium 11. The fourth embodiment differs from the first embodiment in that the RQB medium 11 is arranged in a cavity resonator. The cavity resonator applies an intense high-frequency electromagnetic field to the RQB medium 11. The magnetic filed has an intensity of approximately 80 Mw/cm$^2$. The signal light beams $14_1$ and $14_2$ had intensity of about 8 mW when applied to the RQB medium 11.

Figure 25:
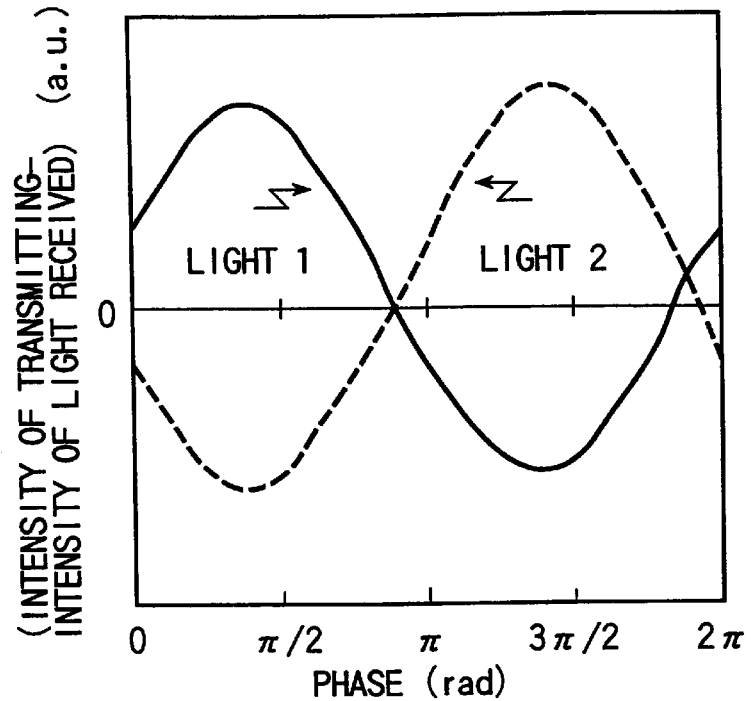
FIG. 25 is a graph illustrating how the amount of light the fourth embodiment absorbs depends on the phase of the external field.

The intensities of the signal light beams $14_1$ and $14_2$ transmitting through the RQB medium 11 were independent monitored, while changing the phase of the external field. FIG. 25 shows how the intensities the light beams transmitting through the medium 11 depended on the phase of the external field.

As seen from FIG. 25, the intensities of the signal light beams $14_1$ and $14_2$ transmitting through the medium 11 cyclically changed with cycle $2\pi$, depending on the phase of the external field. As FIG. 25 shows, both beams $14_1$ and $14_2$ had gains at the phases at which they had maximum intensities, and their intensities changed with the phase of the external field, in inverse proportion to each other with a phase difference of $\pi$. From this it is understood that a quantum interference effect was induced also in the light-modulating element according to the fourth embodiment.

(Fifth Embodiment)

Figure 26:
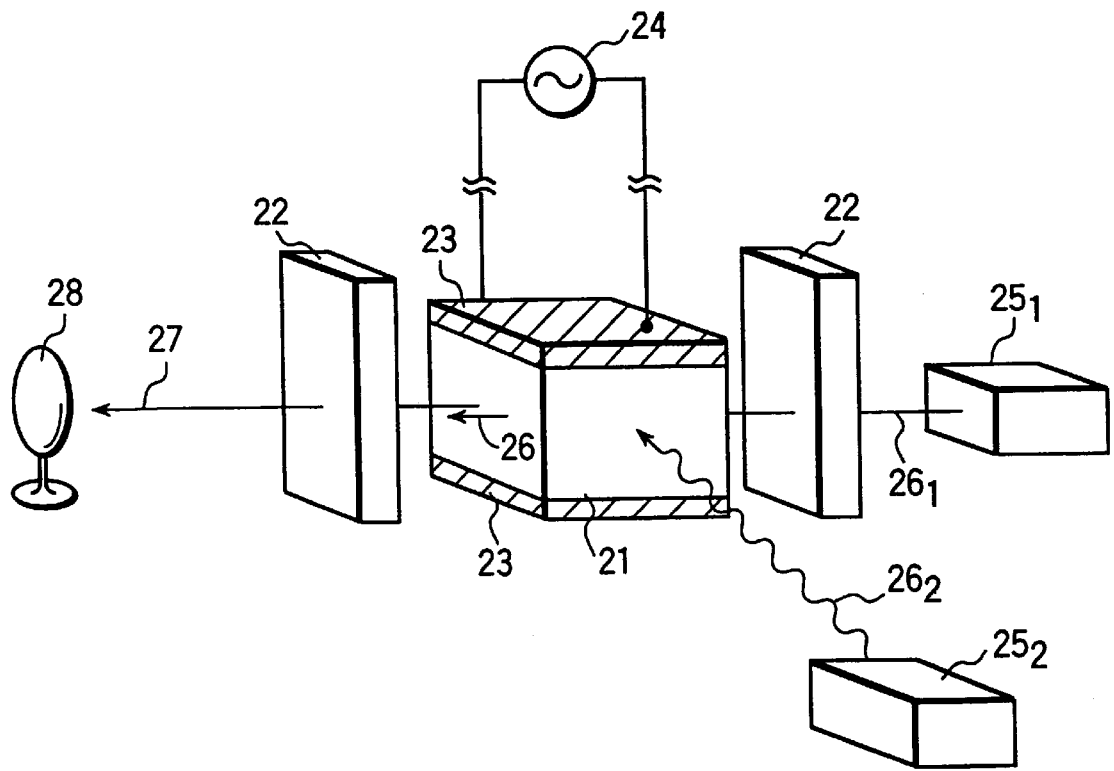
FIG. 26 is a schematic representation of an LWI laser according to a fifth embodiment of the invention.

FIG. 26 shows an LWI laser according to the fifth embodiment of the present invention. In the LWI laser, a high-frequency electric field (an external field) is applied to an RQB medium, thereby to perform quantum dynamic control on the intensities of a light beam emitted from the RQB medium.

As shown in FIG. 26, the LWI laser comprises an RQB medium 21, a pair of mirrors 22, a pair of electrodes 23, a high-frequency power supply 24, two pumping light sources $25_1$ and $25_2$. The RQB medium 21 effects laser oscillation. The mirrors 22 are located at the opposite sides of the medium 21 and at predetermined distances therefrom. The electrodes 23 are provided on the other opposite sides of the RQB medium 21. The high-frequency power supply 24 applies a high-frequency voltage to the electrodes 23 so as to excite the medium 21 with a high-frequency electric field. The pumping light sources $25_1$ and $25_2$ emit pumping light beams $26_1$ and $26_2$ to pump electrons to higher levels of laser transition. The optical fibers guide pumping light beams $26_1$ and $26_2$ to the RQB medium 21. Also shown in FIG. 26 is a photodiode 28, which measures the intensity of the LWI laser beam 27 emitted from the RQB medium 21.

The pumping light source $25_1$ emits a coherent light beam, whereas the pumping light source $25_2$ is a lamp which emits an incoherent light beam.

The electrodes 23 may be replaced by a pair of electromagnets or by a cavity resonator. In either case, the external field is a high-frequency electromagnetic field. In the case a cavity resonator is used in place of the electrodes $12$,. it should have such a shape as would apply practically only a high-frequency electromagnetic field to the RQB medium 11.

Figure 27A:
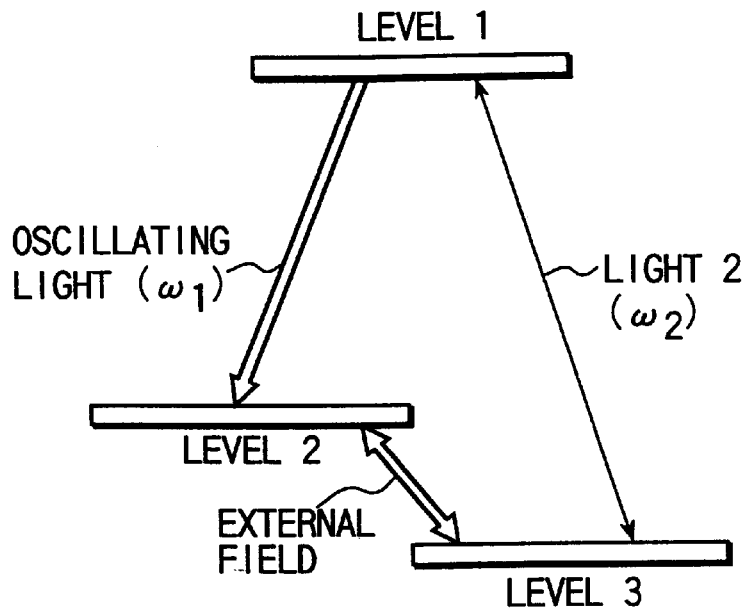
FIGS. 27A and 27B are qualitative energy diagrams, each showing the relation which energy levels, pumping light and an external field have in the LWI laser shown in FIG. 26.
Figure 27B:
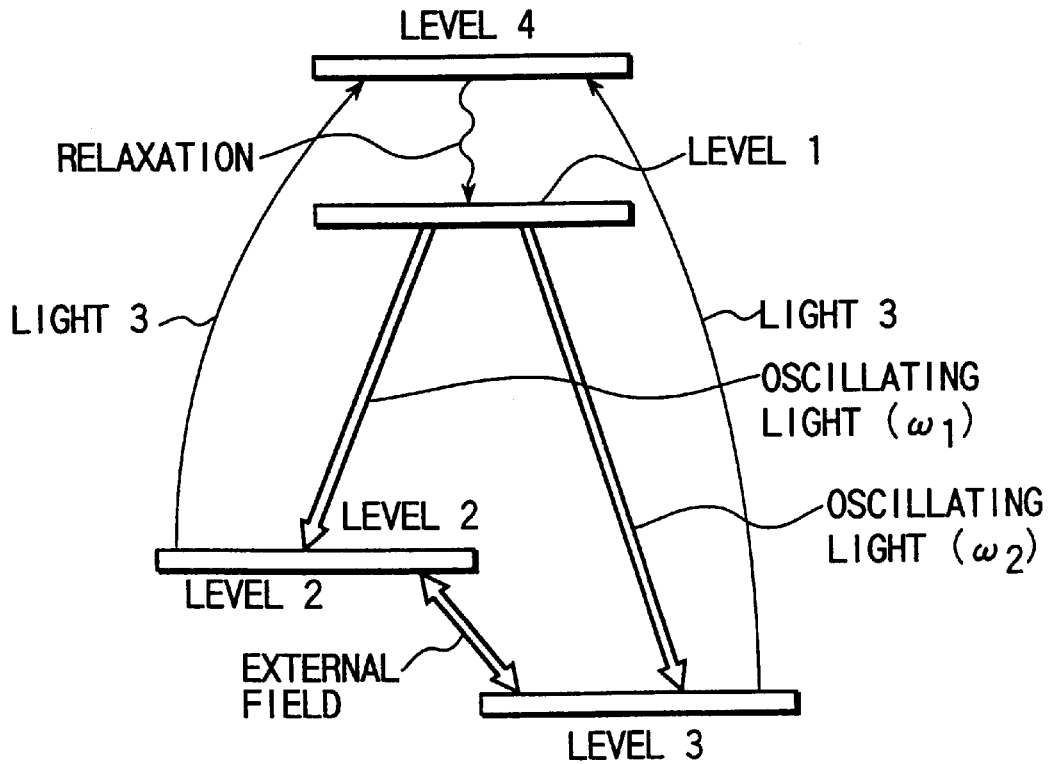

FIGS. 27A and 27B show the level scheme of the LWI laser according to the fifth embodiment. To emit a laser beam by the transition of frequency $\omega_1$ or $\omega_2$, a laser beam 2 of frequency $\omega_2$ or a laser beam 1 of frequency $\omega_1$ is used as shown in FIG. 27A. To emit two laser beams by the transitions of frequencies $\omega_1$ and $\omega_2$, a laser beam 3 that can be excited to level 4 is used as shown in FIG. 27B. The laser beam 3 can be replaced by an incoherent light beam.

In order to increase the intensity of the laser beam by means of single-wave oscillation, it is desired that the beams 2 and 3 or the light beams 1 and 3 should be used. In FIG. 26, arrow 26 indicates either the pumping light beam $26_1$ or the pumping light beam $26_2$.

(Sixth Embodiment)

As described above, the fourth embodiment obtained a gain obtained without inverting the population distribution of electrons. Hence, an LWI laser according to the sixth embodiment has an RQB medium 21 identical to the RQB medium 11 of the fourth embodiment. The LWI characteristic of the RQB medium 21 were measured as will be explained below.

In the sixth embodiment, the pumping light source $25_1$ was a laser, and the transitions $^7F_6(0)\leftarrow\rightarrow{}^1D_2(0)$ were excited. The LWI laser was operated, first in the scheme illustrated in FIG. 27A.

The fifth embodiment incorporates a pair of electrodes 23. In contrast, the sixth embodiment has a cavity resonator, in which the RQB medium 21 is arranged to be applied with a high-frequency electromagnetic field of high intensity of about 50 mW/cm². Both ends of the cavity resonator are mirrors, the positions of which can be adjusted by means of piezoelectric elements. Furthermore, the mirrors have the best possible reflectivity so as to confine the pumping light beam $26_1$ effectively in the cavity resonator.

As the intensity of the pumping light beam $26_1$ was increased, the LWI laser emitted a blue beam that corresponded to the transitions $^7F_6(0)\leftarrow\rightarrow{}^1D_2(0)$. The blue beam had but a very low intensity.

Then, the LWI laser was operated in the scheme illustrated in FIG. 27B. In this case, the RQB medium 21 was arranged, as mentioned above, in the cavity resonator so as to be applied with a high-frequency electromagnetic field of high intensity of about 50 MW/cm². The cavity resonator had windows in both sides to make a xenon beam effectively excite the RQB medium 21. As the intensity of the pumping light beams $26_2$ was increased, while maintaining the external field at intensity 50 MW/cm², the LWI laser performed oscillation of the transitions $^7F_6(0)\leftarrow\rightarrow{}^5D_4(0)$.

Figure 28A:
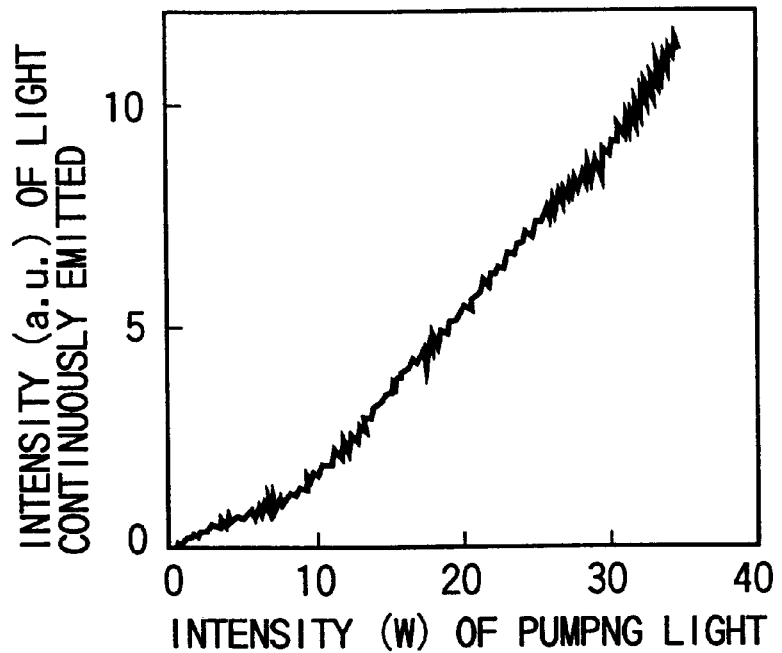
FIG. 28A is a graph showing how the intensity of light emitted by an LWI laser according to a sixth embodiment of the invention depends on the intensity of pumping light applied.
Figure 28B:
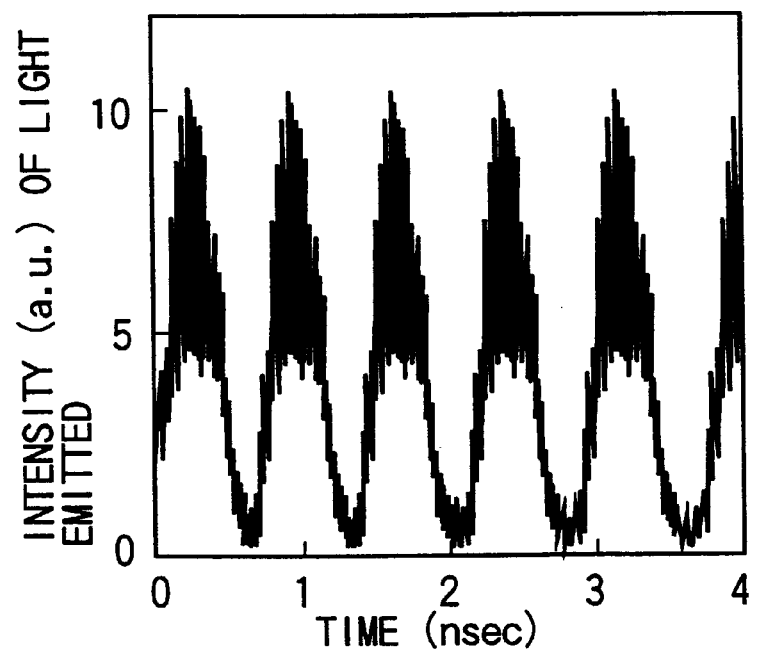
FIG. 28B is a graph showing how the intensity of light the sixth embodiment emits changes with time.

FIG. 28A shows how the intensity of the oscillation depended on the intensities of the pumping light beams $26_2$. As clear from FIG. 28A, the transitions $^7F_6(0)\leftarrow\rightarrow{}^5D_4(0)$ caused laser oscillation. The intensity of the beam that the LWI laser emitted changed with time as is illustrated in FIG. 28B. FIG. 28B shows that the intensity of the laser beam changed cyclically. When the cyclic changes in the intensity of the laser beam were subjected to Fourier transform, a peak was obtained exactly at frequency of 1.36 GHz. This means that the LWI laser emitted two coherent beams which had a frequency difference $\delta\omega$ of 1.36 GHz. From this fact and the gain obtained, it can be understood that the sixth embodiment can accomplish laser oscillation due to a quantum interference effect, almost at the zero threshold value.

(Seventh Embodiment)

The light-modulating element according to the seventh embodiment is identical in basic structure to the first embodiment (FIG. 15). The seventh embodiment differs, however, in that the frequency difference $(\omega_{2-\omega 1})$ between two signal light beams is adjusted to be a positive integral multiple of the frequency $\omega_{ext}$ of the external electric field. This excitation condition of $(\omega_2-\omega_1=N\ \omega_{ext})$, where N is an natural number) can easily be attained merely by adjusting the frequency $\delta\omega$ for the AO element, to N $\omega_{ext}/2$.

The frequency $\omega_{ext}$ is 0.92 MHz as in the first embodiment. The electric field of this frequency causes energy transition of the hyperfine structures at $^1D_2(0)$ in the RQB medium made of YalO$_3$ containing 0.05% of Pr$^{3+}$ ions. The frequency difference $(\omega_{2-\omega 1})$ may not correspond to the energy difference between the hyperfine structures. Even in this case, it is possible, for the following reason, to change the intensities of the beams transmitting through the RQB medium and the intensity of the beam emitted therefrom, merely by changing the phase of the external field.

Figure 29A:
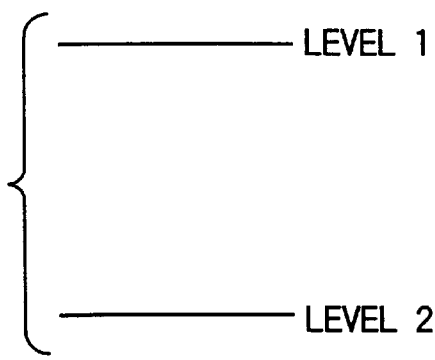
FIGS. 29A and 29B are diagrams depicting the energy levels of a two-level atom which has intensely interacted with a laser beam, so as to explain how close levels assume a dressed-state.
Figure 29B:
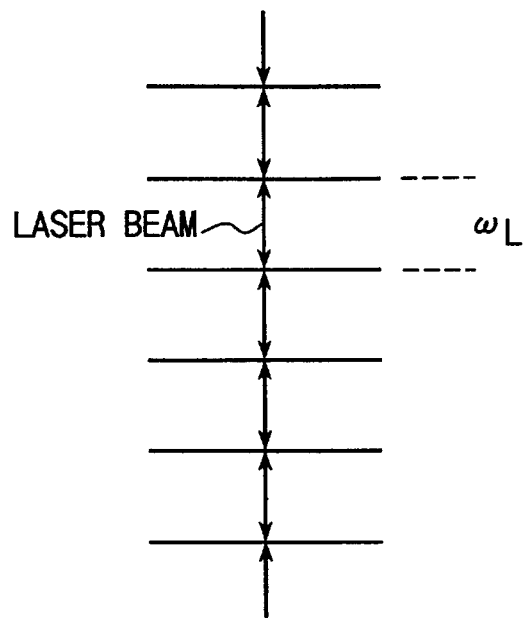

FIGS. 29A and 29B show the energy levels of a two-level atom which has intensely interacted with a laser beam. If no laser beam acts on the atom, the atom can take only two levels 1 and 2 illustrated in FIG. 29A. When a laser beam acts on the atom, the atom can take any countless stepwise levels that are at regular intervals equal to the frequency $\omega_L$ of the laser beam, as is illustrated in FIG. 29B. (Each level shown in FIG. 29B consists of two levels degenerated.) These levels are generally identified as "dressed-states."

Figure 30:
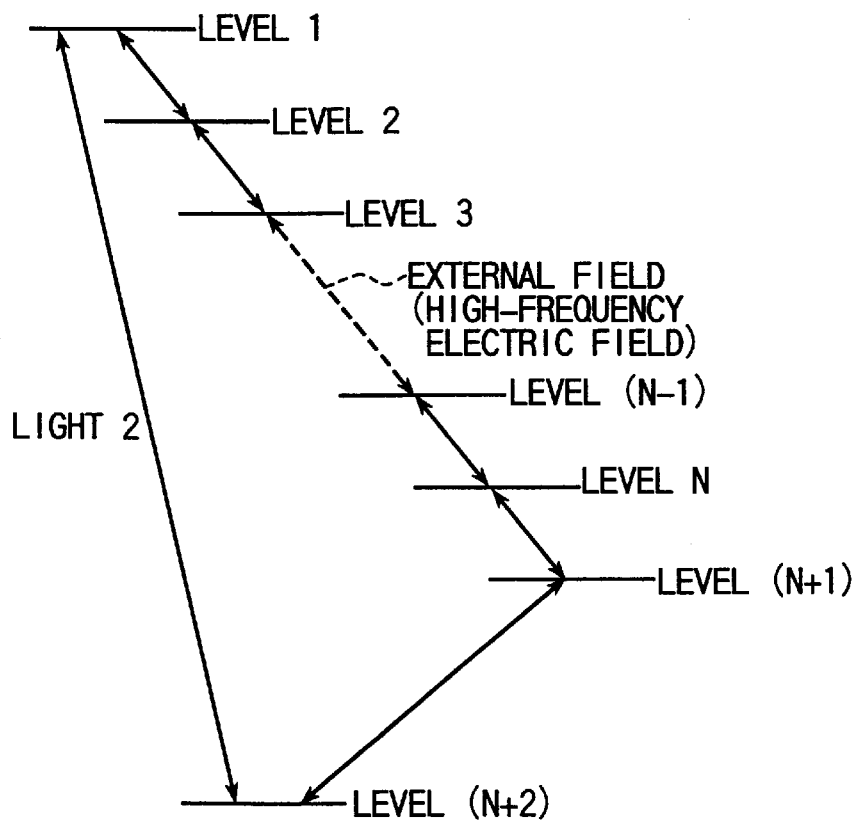
FIG. 30 is a diagram explaining RQB applied to the present invention, more specifically the relation which energy level (N+2), two coherent light beams and a coherent external field have.

When a high-frequency electric field strongly acts on the two levels of a hyperfine structure, there are provided stepwise levels. Thus, if the excitation condition, $(\omega_2-\omega_1=$ $\omega_{ext}$), is satisfied, the excitation can be achieved with two laser beams 1 and 2 and one high-frequency electric field to close (N+2) levels, as is illustrated in FIG. 30. Once the (N+2) levels are closed, the intensities of the beams transmitting through the RQB medium and the intensity of the beam emitted therefrom change if the phase of the external field is changed, no matter how many stepwise levels have been provided.

The cycle of the intensity change of beams, one emitted from the RQB medium and the others transmitting through the RQB medium, largely depends on the number of levels provided. For example, 2N number of phases between 0 to $2\pi$, at which each beam assumes the maximum intensity. Hence, from the cycle of the intensity change of beams, it can be determined how many levels have involved in this intensity change.

A light-modulating element according to the seventh embodiment was made for testing.

In the test of the light-modulating element, the frequency difference ($\omega_2\omega_1$) was adjusted 1.84 MHz, 2.76 MHz, 3.68 MHz, 4.60 MHz and 5.52 MHz, thereby to modulate signal light beams. (That is, N was set at 2, 3, 4, 5 and 6.) The signal light beams had intensities of about 1 mW when applied to the RQB medium, and the electric field applied as external field had an intensity of about $2\times10^2$ V/cm.

Figure 31:
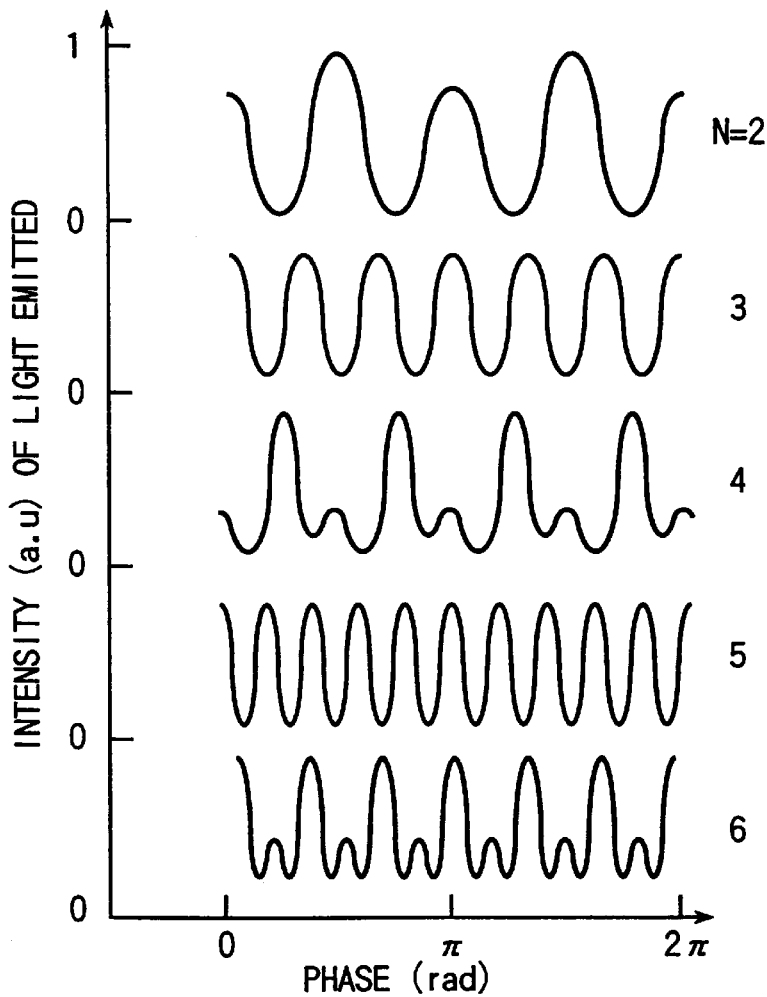
FIG. 31 is a graph illustrating how the intensity of light emitted by a light-modulating element according to a seventh embodiment of the invention depends on the phase.

The intensity of the light beam emitted from the hyperfine structure in the state $^1D_2(0)$ was monitored, while changing the phase of the external field. FIG. 31 shows how the intensities the light beam emitted depended on the phase of the external field. The phases plotted on the abscissa in FIG. 31 are of relative values which are slightly different from the actual values.

As can be seen from FIG. 31, the intensity of the light emitted from the medium greatly depended on the phase of the external field. The larger the frequency difference ($\omega_2-\omega_1$), the shorter the cycle of the change in the intensity. Comparison of FIG. 31 with FIG. 30 which shows the characteristic of quantum interference at the (N+2) levels reveals that the absorption and emission changed very similarly with the phase of the external field. From this it is understood that a quantum interference effect was induced in the light-modulating element according to the seventh embodiment.

(Eighth Embodiment)

The light-modulating element according to the eighth embodiment is identical in basic structure to the first embodiment (FIG. 15). The eighth embodiment differs, however, in two respects. First, the frequency $\omega_{ext}$ of the high-frequency electromagnetic field, i.e., the external electric field, is lower than the frequency difference $\omega$ between the hyperfine structures in the state 1D2 in the RQB medium made of YalO$_3$ containing 0.05% of Pr$^{3+}$ ions. Second, the frequency ($\omega_{ext}$ is adjusted so that its integral multiple may be equal to the frequency difference $\omega$, that is, N $\omega_{ext}$=$\omega$, where N is a natural number). As in the first embodiment, N $\omega_{ext}$ is 0.92 MHz and the frequency difference ($\omega_2-\omega_1$) between the two signal light beams is adjusted to 0.92 MHz.

Even if the frequency of the high-frequency electromagnetic field is low, the impurity ions (i.e., hyperfine structures) can be excited by virtue of Nth-power nonlinear effect, provided that the integral multiple of $\omega_{ext}$ is nearly equal to the frequency difference $\omega$. Thus, the use of the nonlinear effect makes it possible to excite only the impurity ions efficiently by using a high-frequency electric field having a frequency different from the frequency difference $\omega$, even if the matrix absorbs the high-frequency electric field at a frequency nearly equal to the frequency difference $\omega$. If the excitation condition, ($\omega_2-\omega_1$=N ($\omega_{ext}$), is satisfied, the absorption and emission of the ions can be changed freely by virtue of the quantum interference effect, has been explained in connection with the seventh embodiment.

A light-modulating element according to the eighth embodiment was made for testing.

In the test of this light-modulating element, the frequency $\omega_{ext}$ of the external electric field was adjusted to 0.46 MHz, 0.31 MHz and 0.23 MHz, thereby to modulate the signal light beams. (That is, N was set at 2, 3 and 4.) The signal light beams had intensities of about 1 mW when applied to the RQB medium, and the electric field applied as external field had an intensity of about $2\times10^2$ V/cm.

Figure 32:
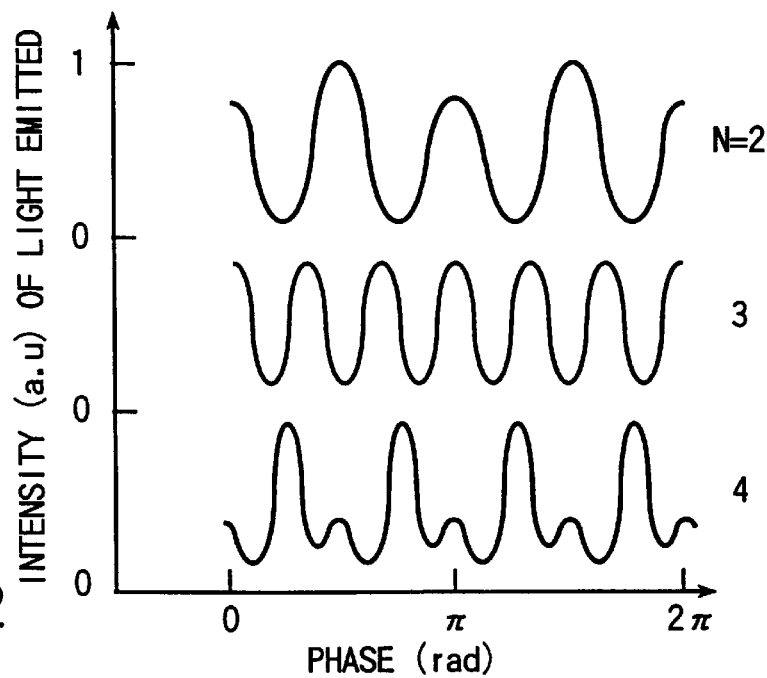
FIG. 32 is a graph illustrating how the intensity of light emitted by a light-modulating element according to an eighth embodiment of the invention depends on the phase.

The intensity of the light beam emitted from the hyperfine structure in the state $^1D_2(0)$ was monitored, while changing the phase of the external field. FIG. 32 shows how the intensities the light beam emitted depended on the phase of the external field. As can be seen from FIG. 32, the intensity of the light emitted from the medium greatly depended on the phase of the external field. The larger the frequency $\omega_{ext}$ of the external electric field, the shorter the cycle of the change in the intensity. From this it is understood that a quantum interference effect was induced in the light-modulating element according to the eighth embodiment, too.

(Ninth Embodiment)

The light-modulating element according to the ninth embodiment is identical in basic structure to the first embodiment (FIG. 15). The ninth embodiment is characterized in that one coherent pulse light beam is applied to the RQB medium, not two coherent signal light beams as in the first embodiment. If a pulse light beam is applied to the RQB medium, the absorption and emission of the ions can be changed by changing the phase of the external field. The reason why will be described below.

Figure 33:
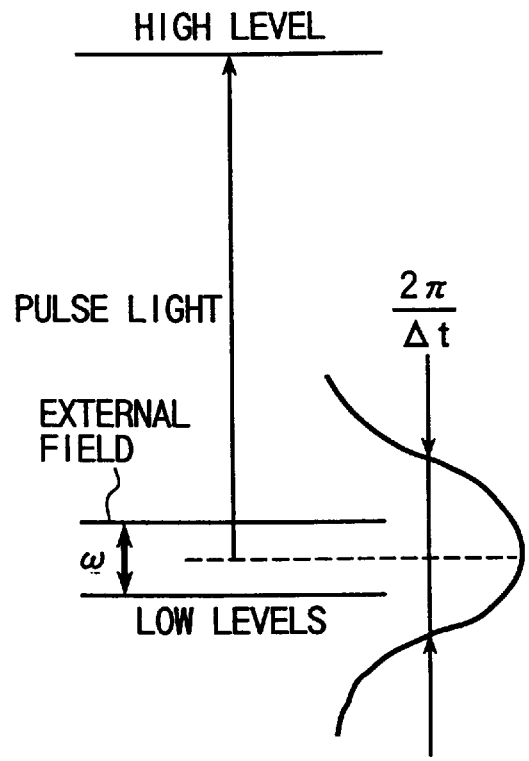
FIG. 33 is a diagram explaining RQB applied to the present invention, more specifically the relation which three energy levels, two coherent light beams and a coherent external field have.

FIG. 33 is a schematic representation of a three-level atom that can assume two low levels and one high level. Two methods are known, which may be used to achieve coherent excitation between the two low levels and the high level by applying light. The first method is to apply, as mentioned above, two CW laser beams having different wavelengths. The second method is to apply one coherent pulse light beam having an energy band broader than the energy difference m between the two low levels. As is generally known, the photon energy (i.e., frequency) of a pulse light beam having a definite time width expands by the reciprocal of the time width, as is understood from the indeterminacy principle. That is, the frequency expands by about $2\pi/\Delta t$, where $\Delta t$ is the time width of the pulse light beam.

Thus, the two low levels can be coherently exited by using a pulse light beam having a time width (i.e., pulse duration) less than $2\pi/\omega$, just as is possible by using two WC laser beams. When applied together with an external field, the pulse light beam can induce RQB (i.e., quantum interaction caused by closed excitation).

In the ninth embodiment, a high-frequency electromagnetic field is used as external field, and the RQB medium is made of YalO$_3$ containing 0.05% of Pr$^{3+}$ ions. The hyperfine structures in state $^3H_4$ in the RQB medium are excited, thereby to modulate a pulse laser beam (i.e., signal light beam). The high-frequency electromagnetic field has a frequency of 21.15 MHz and an intensity of $2\times10^2$ V/cm. The pulse light beam is one emitted from a dye laser which is exited by an excimer laser. The pulse light beam has a center frequency of 16375 cm.$^{-1}$, a time width of 30 nsec, and an intensity of 2 nJ.

A light-modulating element according to the ninth embodiment was made for testing.

In the test of the light-modulating element, the center frequency was adjusted to the energy difference between the states $^3H_4(0)$ and $^1D_2(0)$. The pulse light beam had an energy band of about 33 MHz and could, therefore, excite the hyperfine structures in the state $^3H_4(0)$ at the same time.

Figure 34:
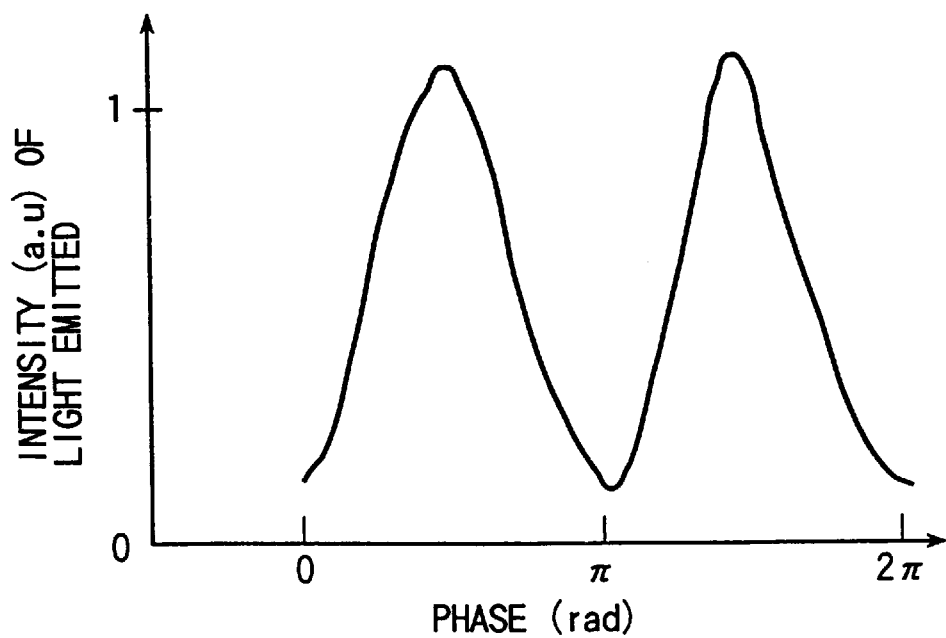
FIG. 34 is a graph showing how the intensity of light emitted by a light-modulating element according to a ninth embodiment of the invention depends on the phase.

The intensity of the light beam emitted from the hyperfine structure in the state $^1D_2(0)$ was monitored, while changing the phase of the external field. FIG. 34 shows how the intensity of the light beam emitted depended on the phase of the external field. As FIG. 34 shows, the intensity of the light emitted from the medium greatly depended on the phase of the external field. This means that a quantum interference effect was induced in the light-modulating element according to the ninth embodiment.

In the test, the frequency of the high-frequency electromagnetic field was decreased to a half of 21.15 MHz. Also this case, the intensity of the beam transmitting through the RQB medium and the intensity of the beam emitted therefrom much depended on the phase of the external field. Obviously, quantum interference was induced in the light-modulating element, in the same way as in the eighth embodiment in which $\omega_{ext}=\omega/N$.

The present invention is not limited to the embodiments described above. Rather, various changes and modifications can be made, without departing from the scope and spirit of the invention. For example, an electromagnetic wave or the like may be used as external field if it can excite between specific levels, in place of such an electric field or such a magnetic field as is used in the embodiment described above, may be replaced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A function element comprising:
   a solid body including quantum structures having a first level, a second level lower than said first level, and a third level lower than said second level;
   a light-applying device configured to apply a first coherent light beam to the solid body to excite an energy transition between the first and second levels, and to apply a second coherent light beam to the solid body to excite an energy transition between the first and third levels; and
   a field-applying device configured to apply an external field having a phase, an angular frequency, and a Rabi frequency to the solid body to excite an energy, transition between the second and third levels, said field-applying device being configured to control any one of the phase, the angular frequency, and the Rabi frequency of the external field in order to control transparency of the solid body relative to the first and second coherent light beams,
   wherein the following conditions are satisfied:
   $\sigma_{23} \leq \sigma_{12}$ and $\sigma_{23} \leq \sigma_{13}$,
   wherein $\sigma_{12}$ is standard deviation of resonance angular frequencies $\omega_{12}(i)$ between the first and second levels, $\sigma_{13}$ is standard deviation of resonance angular frequencies $\omega_{13}(i)$ between the first and third levels, and $\sigma_{23}$ is standard deviation of resonance angular frequencies $\omega_{23}(i)$ between the second and third levels, for all n number of quantum structures existing in the solid body, and $\sigma_{12}$, $\sigma_{13}$ and $\sigma_{23}$ are represented as follows:

$$\sigma_{12}=\{(1/n)\Sigma[\omega_{12}(i)-<\omega_{12}>^2]\}^{1/2},$$

$$\sigma_{13}=\{(1/n)\Sigma[\omega_{13}(i)-<\omega_{13}>^2]\}^{1/2},$$

$$\sigma_{23}=\{(1/n)\Sigma[\omega_{23}(i)-<\omega_{23}>^2]\}^{1/2},$$

where $<\omega_{12}>$ is an average of the resonance angular frequencies $\omega_{12}(i)$ (i=1 to n), $<\omega_{13}>$ is an average of the resonance angular frequencies $\omega_{13}(i)$ (i=1 to n), and $<\omega_{23}>$ is an average of the resonance angular frequencies $\omega_{23}(i)$ (i=1 to n).

2. The function element according to claim 1, wherein intensities of first and second coherent light beams passing through the solid body and an intensity of a light beam emitted from the first level change based on the phase of the external field.

3. The function element according to claim 1 or 2, wherein the first and second coherent light beams are the same coherent pulse light beam which has a center frequency higher than the average of the resonance angular frequencies $<\omega_{12}>$ and lower than the average of the resonance angular frequencies $<\omega_{13}>$, and which has a duration shorter than $2\pi/(<\omega_{13}>-<\omega_{12}>)$.

4. The function element according to claim 1, further comprising a resonator having a pair of mirrors configured to allow the function element to emit a least one of the coherent light beams in the form of a laser beam.

5. The function element according to any one of claims 1, 2 and 4, wherein the solid body includes transition metal ions having n number of electrons in d shell (n=1 to 9) or rare earth ions having m number of electrons in f shell (m=1 to 13), wherein the second and third levels of the transition metal ions are selected from levels divided from one level by spin-orbit interaction, hyper-fine coupling or nuclear quadruple interaction, and wherein the second and third levels of the rare earth ions are selected from levels divided from one level by hyper-fine coupling or nuclear quadruple interaction.

6. The function element according to claim 5, wherein the external field is an AC electric field, an AC magnetic field or an electromagnetic field, and satisfies the following condition:

$$\omega_2-\omega_1=N\cdot\omega_{ext}$$

where $\omega_{ext}$ is an angular frequency of the external field, $\omega_1$ is an angular frequency of the first coherent light beam, $\omega_2$ is an angular frequency of the second coherent light beam, and N is a natural number.

7. The function element according to claim 5, wherein the first and second coherent light beams are the same coherent pulse light beam which has a center frequency higher than the average of the resonance angular frequencies $<\omega_{12}>$ and lower than the average of the resonance angular frequencies $<\omega_{13}>$, and which has a duration shorter than $2\pi(<\omega_{13}>-<\omega_{12}>)$.

8. The function element according to claim 7, wherein the external field is an AC electric field, an AC magnetic field or an electromagnetic field, and satisfies the following condition:

$$<\omega_{13}>-<\omega_{12}>=N\cdot\omega_{ext}$$

where $\omega_{ext}$ is an angular frequency of the external field, and N is a natural number.

9. The function element according to any one of claims 1, 2 and 4, wherein the first and second coherent light beams are the same coherent pulse light beam which has a center frequency higher than the average of the resonance angular frequencies $<\omega_{12}>$ and lower than the average of the resonance angular frequencies $<\omega_{13}>$, and which has a duration shorter than $2\pi/(<\omega_{13}>-<\omega_{13}>)$, and wherein the external field is an AC electric field, an AC magnetic field or an electromagnetic field, and satisfies the following condition:

$$<\omega_{13}>-<\omega_{12}>=N\cdot\omega_{ext}$$

where $\omega_{ext}$ is an angular frequency of the external field, and N is a natural number.

10. A function element comprising:

a solid body including quantum structures having a first level, a second level lower than said first level, and a third level lower than said second level;

a light-applying device configured to apply a first coherent light beam to the solid body to excite an energy transition between the second and third levels, and to apply a second coherent light beam to the solid body to excite an energy transition between the first and third levels; and a field-applying device configured to apply an external field having a phase, an angular frequency, and a Rabi frequency to the solid body to excite an energy transition between the first and second levels, said field-applying device being configured to control any one of the phase, the angular frequency, and the Rabi frequency of the external field in order to control transparency of the solid body relative to the first and second coherent light beams, where the following conditions are satisfied:

$\sigma_{23} \leq \sigma_{12}$ and $\sigma_{23} \leq \sigma_{13}$, wherein $\sigma_{12}$ is standard deviation of resonance angular frequencies $\omega_{12}(i)$ between the first and second levels, $\sigma_{13}$ is standard deviation of resonance angular frequencies $\omega_{13}(i)$ between the first and third levels, and $\sigma_{23}$ is standard deviation of resonance angular frequencies $\omega_{23}(i)[\omega_{12}(i)]$ between the second and third levels, for all n number of quantum structures existing in the solid body, and $\sigma_{12}$, $\sigma_{13}$ and $\sigma_{23}$ are represented as follows:

$$\sigma_{12}=\{(1/n)\Sigma[\omega_{12}(i)-<\omega_{12}>^2]\}^{1/2},$$

$$\sigma_{13}=\{(1/n)\Sigma[\omega_{13}(i)-<\omega_{13}>^2]\}^{1/2},$$

$$\sigma_{23}=\{(1/n)\Sigma[\omega_{23}(i)-<\omega_{23}>^2]\}^{1/2},$$

where $<\omega_{12}>$ is an average of the resonance angular frequencies $\omega_{12}(i)$ (i=1 to n), $<\omega_{13}>$ is an average of the resonance angular frequencies ($\omega_{13}(i)$ (i=1 to n), and $<\omega_{23}>$ is an average of the resonance angular frequencies $\omega_{23}(i)$ (i=1 to n).

11. The function element according to claim 10, wherein intensities of the first and second coherent light beams passing through the solid body and intensities of light beams emitted from the first and second levels change based on the phase of the external field.

12. The function element according to claim 10 or 11, wherein the first and second coherent light beams are the same coherent pulse light beam which has a center frequency higher than the average of the resonance angular frequencies $<\omega_{23}>$ and lower than the average of the resonance angular frequencies $<\omega_{13}>$, and which has a duration shorter than $2\pi/(<\omega_{13}>-<\omega_{23}>)$.

13. The function element according to claim 10, further comprising a resonator having a pair of mirrors configured to allow the function element to emit a least one of the coherent light beams in the form of a laser beam.

14. The function element according to any one of the claims 10, 11 and 13, wherein the solid body includes transition metal ions having n number of electrons in d shell (n=1 to 9) or rare earth ions having m number of electrons in f shell (m=1 to 13), wherein the first and second levels of the transition metal ions are selected from levels divided from one level by spin-orbit interaction, hyper-fine coupling or nuclear quadruple interaction, and wherein the first and second levels of the rare earth ions are selected from levels divided from one level by hyper-fine coupling or nuclear quadruple interaction.

15. The function element according to claim 14, wherein the external field is an AC electric field, an AC magnetic field or an electromagnetic field, and satisfies the following condition:

$$\omega_2-\omega_1=N\cdot\omega_{ext}$$

where $\omega_{ext}$ is an angular frequency of the external field, $\omega_1$ is an angular frequency of the first coherent light beam, $\omega_2$ is an angular frequency of the second coherent light beam, and N is a natural number.

16. The function element according to claim 14, wherein the first and second coherent light beams are the same coherent pulse light beam which has a center frequency higher than the average of the resonance angular frequencies $<\omega_{23}>$ and lower than the average of the resonance angular frequencies $<\omega_{13}>$, and which has a duration shorter than $2\pi/(<\omega_{13}>-<\omega_{23}>)$.

17. The function element according to claim 16, wherein the external field is an AC electric field, an AC magnetic field or an electromagnetic field, and satisfies the following condition:

$$<\omega_{13}>-<\omega_{23}>=N\cdot\omega_{ext}$$

where $\omega_{ext}$ is an angular frequency of the external field, and N is a natural number.

18. The function element according to any one of claims 1, 10, 2, 11, 4, and 13 wherein the external field is an AC electric field, an AC magnetic field or an electromagnetic field, and satisfies the following condition:

$$\omega_2-\omega_1=N\cdot\omega_{ext}$$

where $\omega_{ext}$ is an angular frequency of the external field, $\omega_1$ is an angular frequency of the first coherent light beam, $\omega_2$ is an angular frequency of the second coherent light beam, and N is a natural number.

19. The function element according to any one of claims 10, 11 and 13, wherein the first and second coherent light beams are the same coherent pulse light beam which has a center frequency higher than the average of the resonance angular frequencies $<\omega_{23}>$ and lower than the average of the resonance angular frequencies $<\omega_{13}>$, and which has a duration shorter than $2\pi/(<\omega_{13}>-<\omega_{23}>)$, and wherein the external field is an AC electric field, an AC magnetic field or an electromagnetic field, and satisfies the following condition:

$$<\omega_{13}>-<\omega_{23}>=N\cdot\omega_{ext}$$

where $\omega_{ext}$ is an angular frequency of the external field, and N is a natural number.

20. A function element comprising:
- a solid body including quantum structures having a first level, a second level lower than said first level, and a third level lower than said second level;
- a light source configured to apply a first coherent light beam to the solid body to excite an energy transition between the first and second levels, and to apply a second coherent light beam to the solid body to excite an energy transition between the first and third levels; and
- a field source configured to apply an external field selected from the group consisting of an electric field, a magnetic field and an electromagnetic field, and having a phase, an angular frequency, and a Rabi frequency to the solid body to excite an energy transition between the second and third levels, said field-applying device being configured to control any one of the phase, the angular frequency, and the Rabi frequency of the external field in order to control transparency of the solid body relative to the first and second coherent light beams, wherein the following conditions are satisfied:

$\sigma_{23} \leq \sigma_{12}$ and $\sigma_{23} \leq \sigma_{13}$, wherein $\sigma_{12}$ is standard deviation of resonance angular frequencies $\omega_{12}(i)$ between the first and second levels, $\sigma_{13}$ is standard deviation of resonance angular frequencies $\omega_{13}(i)$ between the first and third levels, and $\sigma_{23}$ is standard deviation of resonance angular frequencies $\omega_{23}(i)$ between the second and third levels, for all n number of quantum structures existing in the solid body, and $\sigma_{12}$, $\sigma_{13}$ and $\sigma_{23}$ are represented as follows:

$\sigma_{12} = \{(1/n)\Sigma[\omega_{12}(i) - <\omega_{12}>^2]\}^{1/2}$, $\sigma_{13} = \{(1/n)\Sigma[\omega_{13}(i) - <\omega_{13}>^2]\}^{1/2}$, $\sigma_{23} = \{(1/n)\Sigma[\omega_{23}(i) - <\omega_{23}>^2]\}^{1/2}$, where $<\omega_{12}>$ is an average of the resonance angular frequencies $\omega_{12}(i)$ (i=1 to n), $<\omega_{13}>$ is an average of the resonance angular frequencies $\omega_{13}(i)$ (i=1 to n), and $<\omega_{23}>$ is an average of the resonance angular frequencies $\omega_{23}(i)$ (i=1 to n).

21. A function element comprising:
- a solid body including quantum structures having a first level, a second level lower than said first level, and a third level lower than said second level;
- a light source configured to apply a first coherent light beam to the solid body to excite an energy transition between the second and third levels, and to apply a second coherent light beam to the solid body to excite an energy transition between the first and third levels; and
- a field source configured to apply an external field selected from the group consisting of an electric field, a magnetic field and an electromagnetic field, and having a phase, an angular frequency, and a Rabi frequency, to the solid body to excite an energy transition between the second and third levels, said field-applying device being configured to control any one of the phase, the angular frequency, and the Rabi frequency of the external field in order to control transparency of the solid body relative to the first and second coherent light beams, wherein the following conditions are satisfied:

$\sigma_{12} \leq \sigma_{13}$ and $\sigma_{12} \leq \sigma_{23}$, where $\sigma_{12}$ is standard deviation of resonance angular frequencies $\omega_{12}(i)$ between the first and second levels, $\sigma_{13}$ is standard deviation of resonance angular frequencies $\omega_{13}(i)$ between the first and third levels, and $\sigma_{23}$ is standard deviation of resonance angular frequencies $\omega_{23}(i)$ between the second and third levels, for all n number of quantum structures existing in the solid body, and $\sigma_{12}$, $\sigma_{13}$ and $\sigma_{23}$ are represented as follows:

$\sigma_{12} = \{(1/n)\Sigma[\omega_{12}(i) - <\omega_{12}>^2]\}^{1/2}$, $\sigma_{13} = \{(1/n)\Sigma[\omega_{13}(i) - <\omega_{13}>^2]\}^{1/2}$, $\sigma_{23} = \{(1/n)\Sigma[\omega_{23}(i) - <\omega_{23}>^2]\}^{1/2}$, where $<\omega_{12}>$ is an average of the resonance angular frequencies $\omega_{12}(i)$ (i=1 to n), $<\omega_{13}>$ is an average of the resonance angular frequencies $\omega_{13}(i)$ (i=1 to n), and $<\omega_{23}>$ is an average of the resonance angular frequencies $\omega_{23}(i)$ (i=1 to n).

22. A function element comprising:
- a solid body with electromagnetically induced transparency, including quantum structures having a first level, a second level lower than said first level, and a third level lower than said second level;
- a light-applying device configured to apply a first coherent light beam to the solid body to excite an energy transition between the first and second levels, and to apply a second coherent light beam to the solid body to excite an energy transition between the first and third levels; and
- a field-applying device configured to apply an external field having a phase, an angular frequency, and a Rabi frequency to the solid body to excite an energy transition between the second and third levels, said field-applying device being configured to control any one of the phase, the angular frequency, and the Rabi frequency of the external field in order to control transparency of the solid body relative to the first and second coherent light beams.

* * * * *